(12) United States Patent
Shahar et al.

(10) Patent No.: US 6,990,281 B2
(45) Date of Patent: Jan. 24, 2006

(54) ALL OPTICAL LOGIC GATES

(75) Inventors: Arie Shahar, Rye Brook, NY (US); Eldan Halberthal, Rye Brook, NY (US)

(73) Assignee: Prima Luci, Inc., Harrison, NY (US)

( * ) Notice: Subject to any disclaimer, the term of this patent is extended or adjusted under 35 U.S.C. 154(b) by 110 days.

(21) Appl. No.: 10/813,108

(22) Filed: Mar. 31, 2004

(65) Prior Publication Data

US 2004/0184750 A1 Sep. 23, 2004

Related U.S. Application Data

(63) Continuation-in-part of application No. 10/404,077, filed on Apr. 2, 2003, and a continuation-in-part of application No. 10/404,140, filed on Apr. 2, 2003, now Pat. No. 6,795,626

(60) Provisional application No. 60/405,697, filed on Aug. 22, 2002, and provisional application No. 60/461,796, filed on Apr. 11, 2003.

(51) Int. Cl.
G02B 6/00 (2006.01)
G02F 3/00 (2006.01)

(52) U.S. Cl. .......................... 385/122; 385/16; 385/14; 385/130; 385/140; 359/108

(58) Field of Classification Search .................. 385/14, 385/16, 17, 18, 129, 130, 131, 132, 147, 385/122, 42, 39, 15, 24, 140; 359/333, 341.1, 359/341.2, 108
See application file for complete search history.

(56) References Cited

U.S. PATENT DOCUMENTS

| | | | | | |
|---|---|---|---|---|---|
| 4,382,660 | A | * | 5/1983 | Pratt et al. | 359/244 |
| 4,689,793 | A | * | 8/1987 | Liu et al. | 372/8 |
| 4,926,177 | A | * | 5/1990 | Sakata | 341/137 |
| 5,307,366 | A | * | 4/1994 | Auffret et al. | 372/96 |
| 5,329,393 | A | * | 7/1994 | Huang | 398/98 |
| 5,414,789 | A | * | 5/1995 | Tamil et al. | 385/122 |
| 5,557,699 | A | * | 9/1996 | Kester et al. | 385/122 |
| 5,600,479 | A | * | 2/1997 | Evans | 359/237 |
| 6,647,163 | B2 | * | 11/2003 | Song | 385/15 |
| 6,674,559 | B2 | * | 1/2004 | Johnson et al. | 359/337.1 |
| 6,819,845 | B2 | * | 11/2004 | Lee et al. | 385/122 |
| 2004/0184750 | A1 | * | 9/2004 | Shahar et al. | 385/122 |

* cited by examiner

Primary Examiner—Brian M. Healy

(74) Attorney, Agent, or Firm—Pearl Cohen Zedek Latzer, LLP

(57) ABSTRACT

An optical AND logic gate includes a summing gate having first and second inputs for receiving first and second optical signals, and a threshold device. The gate produces an output corresponding to the AND product of the first and second optical signals. In another version the AND gate includes first and second inputs for receiving first and second optical signals, and an optical loop for producing an output corresponding to the AND product of the first and second optical signals. In an alternative versions a NAND gate is provided by applying an optical logic NOT on an AND gate.

13 Claims, 20 Drawing Sheets

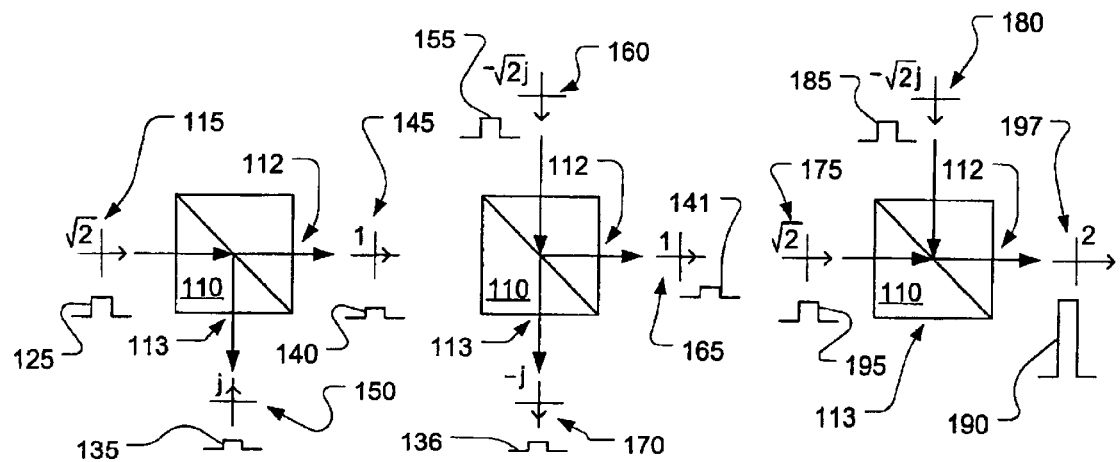
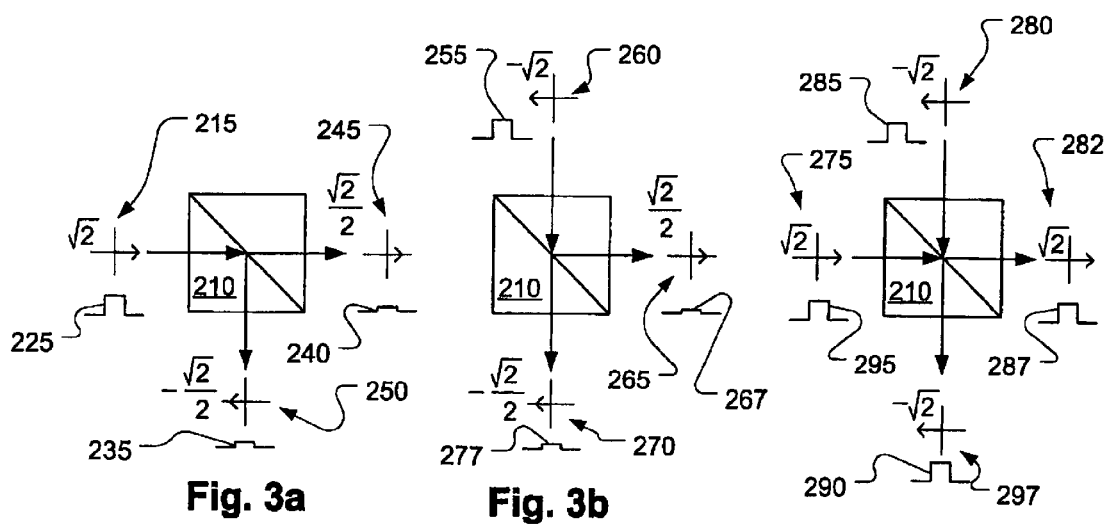

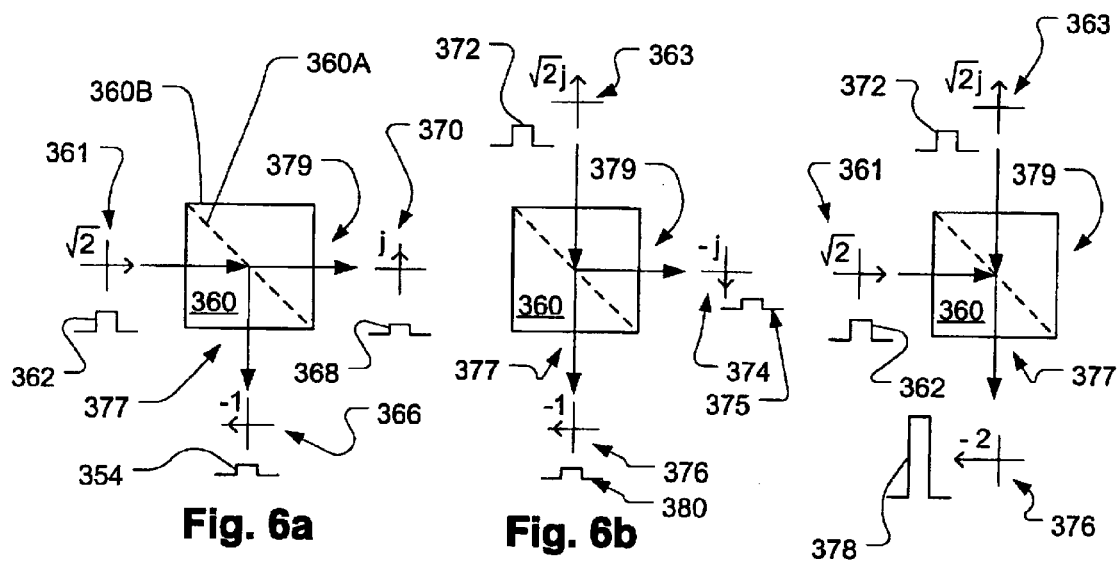
Fig. 6a Fig. 6b Fig. 6c
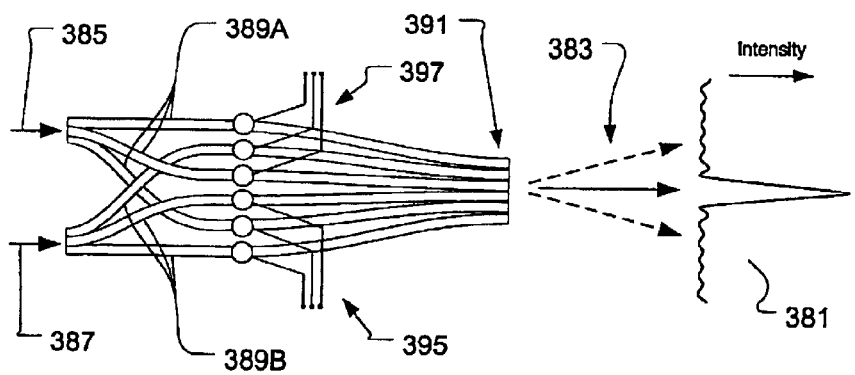
Fig. 7a

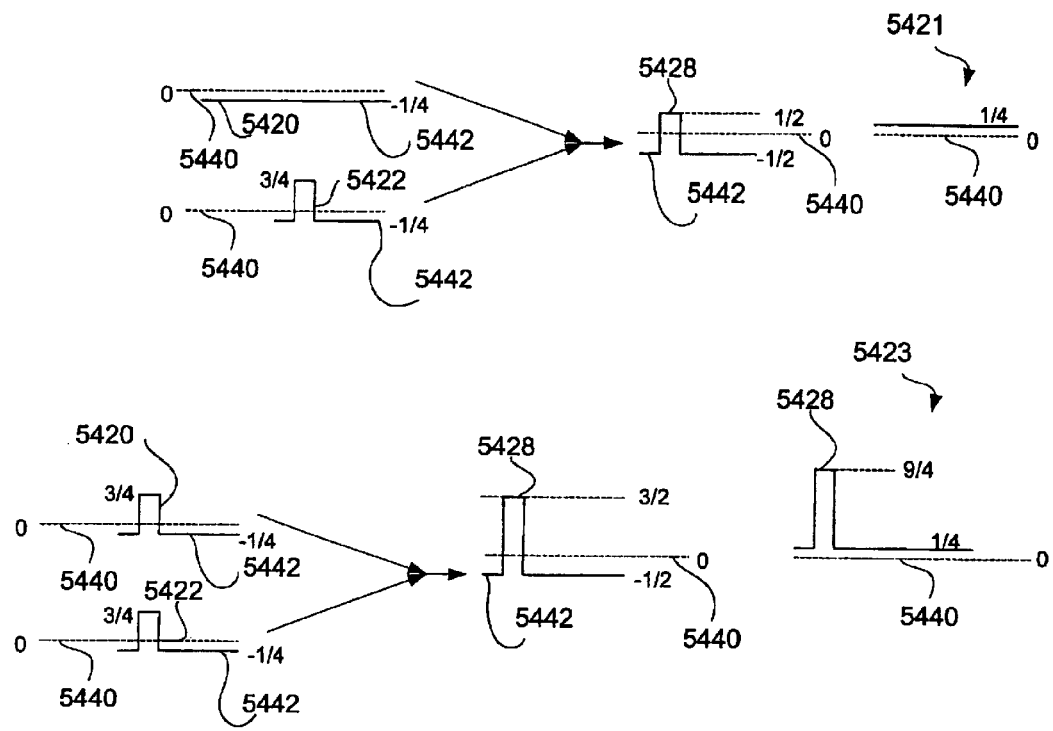
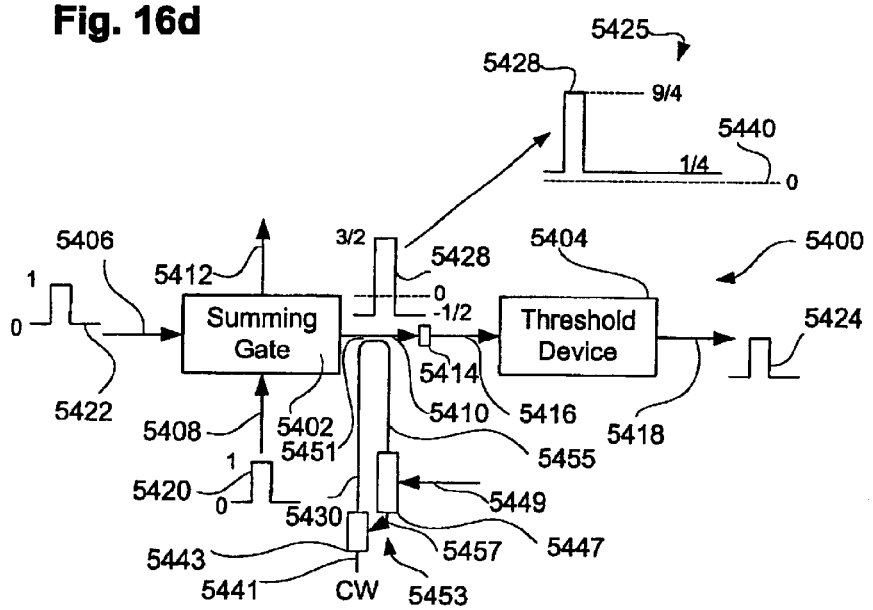
Fig. 16d
Fig. 16e

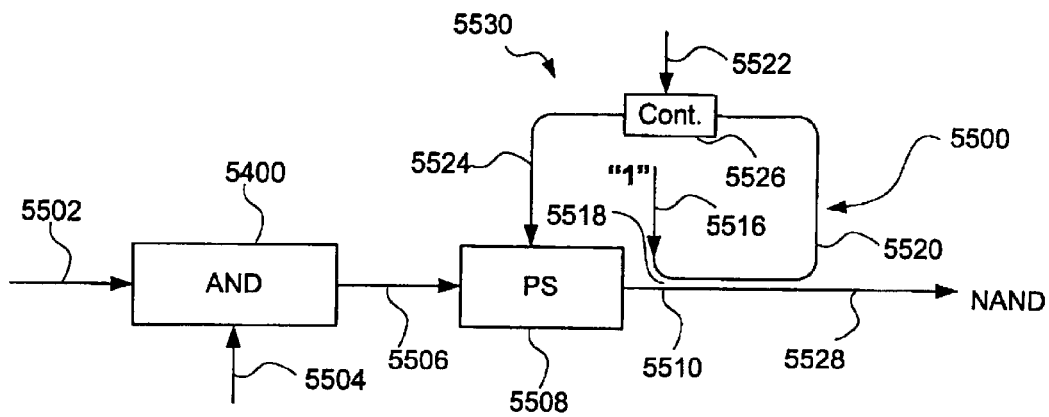
Fig. 19a
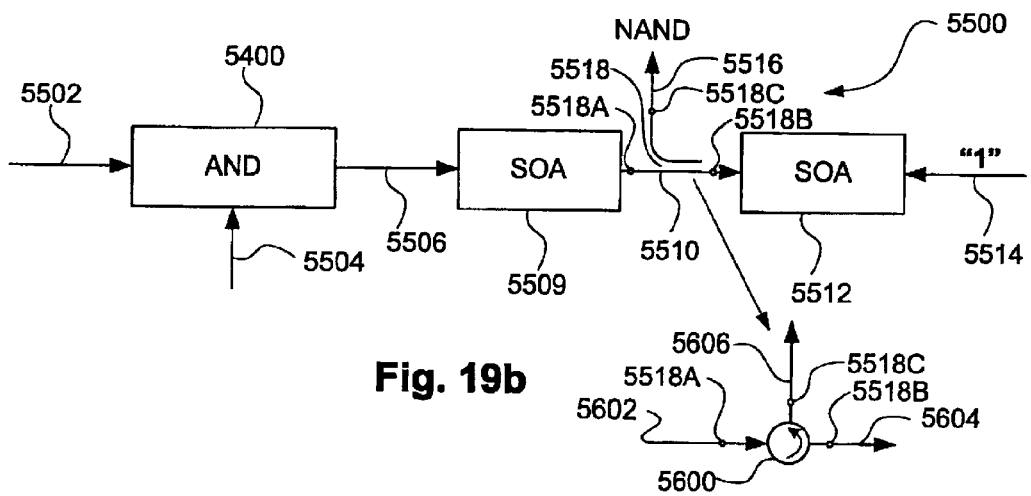
Fig. 19b
Fig. 19c

ALL OPTICAL LOGIC GATES

CROSS-REFERENCE TO RELATED APPLICATIONS

This application claims the benefit of U.S. Provisional Patent Application Ser. No. 60/461,796, filed Apr. 11, 2003, entitled "All Optical Logic Gates", and is a continuation in part of U.S. patent application Ser. Nos. 10/404,077, pending, and 10/404,140 filed Apr. 2, 2003, now U.S. Pat. No. 6,795,626, entitled "Optical Threshold Devices and Methods". The latter application claims the benefit of U.S. Provisional Patent Application Ser. No. 60/405,697, filed Aug. 22, 2002, entitled "Streaming signal control system for digital communications" now filed as four regular U.S. patent application Ser. Nos. 10/640,035, pending; 10/640,035, pending; 10/640,017, pending and 10/640,040, pending filed Aug. 14, 2003, entitled "All Optical Decoding Systems For Decoding Optical Encoded Data Symbols Across Multiple Decoding Layers", "All Optical Decoding Systems For Optical Encoded Data Symbols", "All Optical Cross Routing Using Decoding Systems For Optical Encoded Data Symbols" and "Compact Optical Delay Lines", respectively.

FIELD OF INVENTION

The invention relates to optical logic gates, optical communication devices and systems, optical computing devices and systems and in particularly to optical AND gates, NAND gates and their combinations used to perform optical logic functions and gates.

BACKGROUND OF THE INVENTION

In the field of optical communication and optical computing there is a strong demand for optical gates capable of performing very fast execution of logic functions, switching, and processing. Such optical gates may be used for ultra fast information routing and switching along optical communication networks and may be used to manage and process information in optical computing systems.

U.S. Pat. No. 5,144,375, "Sagnac Optical Logic Gate" by M. Christina Gabriel et. al. (Sep. 1, 1992) discloses an invention for optical gate that is based on a Sagnac loop that includes Non linear Element (NLE) that is excited by an optical pump signal to generate a phase shift.

U.S. Pat. No. 5,987,040, "Optical AND Gate" by Derek Nesset et. al (Nov. 16, 1999) discloses an invention for optical AND gate which is based on the principle of Four-wave mixing (FWM) and incorporating a pump signal to generate a dynamic grating.

U.S. Pat. No. 6,005,994, "Optical Switching Gate" by Robert I. MacDonald et. al (Dec. 21, 1999) discloses an invention for optical AND gate which is based on the principle of changing the absorption of a fiber using two pumping lasers.

As discussed below, the use of control pump signals make the optical gates described in the U.S. Pat. Nos. 375, 040, and 994 more expensive, complicated, slower, power consuming and hard to miniaturize.

The use of external control pump signals requires additional light sources, such as, lasers that operate at wavelengths that are different from the wavelength of the information signals. The need for additional lasers makes the devices more expensive and complicated. In addition, the lasers are made from different materials than those used to produce waveguides, thus they can not be integrated on a chip for miniaturization of the gates.

The power that the pumping sources consume is an additional factor that limits the miniaturization of the gates since it requires the use of heat dissipation techniques. The need for external pump control signals also requires an electronic control and synchronization units which further increases the complication and the cost of such gates.

The need to activate the pumping laser and to turn it on from its non-active state (under the lasing threshold) to its lasing mode is a time consuming process. An additional relatively slow process that starts only after the pumping laser is turned on is the process of the excitation of the Non Linear Element (NLE). The excitation of the NLE, using the turned on laser, from its non-excited state to its saturated level, is also a relatively slow process that adds time to the turn on time of the laser.

Another invention is disclosed in Japanese patent JP6167732 by Nakano Masakazu (1994-06-14). The invention discloses synthesizing means that synthesizes the beams inserted to its input and emitting the synthesized beams toward an absorbing plate. The absorbing plate transmits the light only when it is saturated by a high intensity beam. While patent 732 does not require external control signals, it still suffers from the following drawbacks:

In order for the gate to produce a beam with an intensity that can saturate the absorbing plate, the input beams should have very high intensity (greater than 65 KW). Such high intensity is not practical for many applications used in communication networks and computing systems.

The turn on of the gate to produce a "1" logic state requires the transition of the absorbing plate from ground state to a saturated level. Such a transition is relatively slow and the recovery time from saturated state to ground state might be even longer.

Thus the gate, described in patent 732 is relatively slow and is suitable only for application in which the beams are of very high intensity.

Accordingly, it is an object of this invention to provide optical logic gates such as optical logic AND and NAND gates that are activated by the information signals and do not require the use of external control signals.

It is another object of this invention to provide optical logical gates which are capable of being operated in the range of intensities used in optical communication networks and computing systems.

Still it is an object of this invention to provide fast optical logical gates that their speed is limited only by the recovery time of fast NLE's.

SUMMARY OF THE INVENTION

Some exemplary embodiments of the present invention provide an optical AND logic gate including:
  i) a summing gate having first and second inputs for receiving first and second optical signals and a first output for summing the first and second optical signals to produce a third signal; and
  ii) a threshold device having a third input and a second output;

the third input of the threshold device arranged to receive from the first output of the summing gate the third signal for producing at the second output of the threshold device a signal corresponding to the AND product of the first and second optical signals.

Other exemplary embodiments of the present invention provide an optical AND logic gate including:
  a. a combining device having first and second inputs and a first output, one of the first and second inputs includes an optical delay line;

b. a splitting device having first, second, third and fourth terminals; and c. a nonlinear element;

the third and fourth terminals form an optical loop including the nonlinear element displaced from the center of the optical loop;

the first and second inputs arranged to receive first and second optical signals for producing a third optical signal at the first output of the combining device;

the first terminal of the splitting device arranged to receive the third optical signal from the first output of the combining device for producing at the second terminal a signal corresponding to the AND product of the first and second optical signals.

Additional exemplary embodiments of the present invention provide an optical AND logic gate including:

a. a combining device having first and second inputs and a first output, one of the first and second inputs includes an optical delay line and the first output includes a directing device for directing optical signal returning to the first output into a second output;

b. a splitting device having first, second and third terminals; and c. a nonlinear element;

the second and third terminals form an optical loop including the nonlinear element displaced from the center of the optical loop;

the first and second inputs arranged to receive first and second optical signals for producing a third optical signal at the first output of the combining device;

the first terminal of the splitting device arranged to receive the third optical signal from the first output of the combining device for producing at the second output a signal corresponding to the AND product of the first and second optical signals.

Further exemplary embodiments of the present invention provide an optical AND logic gate including:

a. a combining device having first and second inputs and a first output, one of the first and second inputs includes an optical delay line and the first output includes a directing device for directing optical signal returning to the first output into a second output;

b. a splitting device having first, second and third terminals;

c. a nonlinear element; and d. an attenuator;

the second and third terminals form an optical loop including the attenuator and the nonlinear element that is displaced from the center of the optical loop;

the first and second inputs arranged to receive first and second optical signals for producing a third optical signal at the first output of the combining device;

the first terminal of the splitting device arranged to receive the third optical signal from the first output of the combining device for producing at the second output a signal corresponding to the AND product of the first and second optical signals.

Still further exemplary embodiments of the present invention provide an optical NAND logic gate including:

a. an optical AND gate having first and second inputs for receiving first and second optical signals to produce a third optical signal at a first output corresponding to the AND product of the first and second optical signals; and b. a coherent summing element having a third input for receiving the third optical signal, a fourth input for receiving a continuous beam and a second output for coherently summing the third optical signal and the continuous beam for producing at the second output a signal corresponding to the NAND product of the first and second optical signals.

Yet further exemplary embodiments of the present invention provides an optical NAND logic gate including:

a. an optical AND gate having first and second inputs for receiving first and second optical signals to produce a third optical signal at a first output corresponding to the AND product of the first and second optical signals;

b. a nonlinear element having a third input for receiving the third optical signal and a forth input receiving a continuous beam for transmitting the continuous beam via the nonlinear element into the third input and the first output; and c. the first output of the AND gate includes a directing device for directing the continuous beam from the first output into a second output for producing at the second output a signal corresponding to the NAND product of the first and second optical signals.

While some of the embodiments of the invention are illustrated as being constructed in one of the media of open space, fiber optics, radiation guides, waveguides, and planar waveguides on a chip, each of them may be fabricated in any of these media. It also should be clear that while the descriptions below describe directional couplers they may also be dielectric beam splitter, metal beam splitters, dual gratings, waveguide array gratings and circulators.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIGS. 2a–2c are schematic illustrations of output signals produced by a dielectric beam splitter according to input signals received at its inputs;

FIGS. 3a–3c are schematic illustrations of output signals produced by a metallic beam splitter according to input signals received at its inputs;

FIGS. 6a–6c are schematic illustrations of output signals produced by a high pitch grating according to input signals received at its inputs;

FIG. 7a is a schematic illustration of an interference device made of an array of interleaved radiation guides;

FIG. 12b is a schematic illustration of an exemplary attenuator design that may be used in conjunction with the threshold device of FIG. 12a;

FIG. 16d is a schematic illustration of a method to enhance the ratio between the coincidence output signal and the baseline;

FIG. 16e is a schematic illustration of an embodiment for enhancing the ratio between the coincidence output signal and the baseline;

FIG. 19a is a block diagram illustrating NAND logic gates according to the present invention;

FIG. 19b is a block diagram illustrating phase insensitive NAND logic gates according to the present invention; and, FIG. 19c is a schematic illustration of an optical circulator serving as a directing device.

DETAILED DESCRIPTION OF EXEMPLARY EMBODIMENTS OF THE INVENTION

Figure 1A:
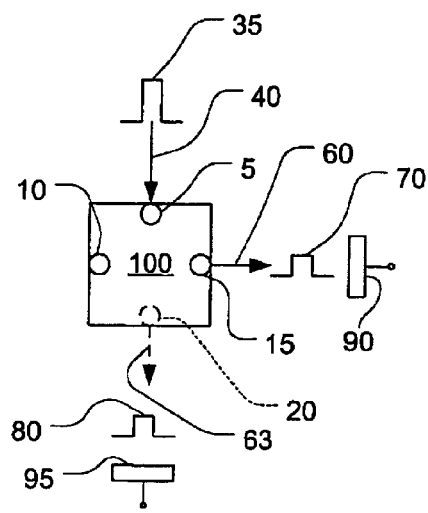
FIGS. 1a–1d are schematic illustrations of output signals produced by a gate according to input signals received at its inputs.

Some of the logic gates according to the present invention, which are discussed first, include summing gates that are combined with threshold devices. The summing gates include two inputs and at least two outputs in a configuration that one of the outputs is used as a coincidence output. The signals produced, by the summing gate at its coincidence output, are fed into the input of a threshold device. The threshold device produces an output signal only if it is fed, at its input, by a signal that its amplitude is above a certain threshold level. Each of the inputs of the summing gate may receive input signals A or B. When either of the inputs of the summing gate receives input signal A or B (a non-coincidence state), a low level signal that is under the threshold level of the threshold device is produced, by the summing gate, at the coincidence output. In this case, the threshold device receives, at its input, a signal that is below its threshold and thus no output signal is produced.

When both of the inputs of the summing gate simultaneously receive input signals A and B (a coincidence state), a high level signal that is above the threshold level of the threshold device is produced by the summing gate, at the coincidence output. In this case, the threshold device receives, at its input, a signal that is above its threshold and thus an output signal is produced. Accordingly, it is clear that the combination of the summing gate with the threshold device operates as an AND gate and perform the logic function AND (symbolically marked A·B)

For a better understanding of the invention a description of the structure and way of operation of different summing gates is provided first and is followed by a description of threshold devices The summing gates described below and illustrated by FIGS. 4a–4e, 6a–6c, 7a–7b, and 8a–8d have a novel structure designed according to the present invention. FIGS. 2a–2c, 3a–3c, 5a–5c, and 8e illustrate dielectric beam splitters, metallic beam splitters, reverse Y-junction combiners, and directional coupler combiners, respectively. Though, the structures of the components illustrated by FIGS. 2a–2c, 3a–3c, 5a–5c, and 8e are known in the art, still, the way that they are used as summing gates to provide input signals to the threshold devices, using coherent summing and non-coherent summing, is unique to the present invention. For example and as explained below, ratios of 2:1, 4:1, and 9:1 between the coincidence output signal and the non-coincidence output signal is obtained when using non-coherent summing, proper coherent summing, and, enhanced coherent summing, respectively.

Summing Gates
  Coincidence Gate
  I. Illustration of Behavior
  FIGS. 1a, 1b, 1c, and 1d are figurative illustrations of a gate 100 that directs applied energy, for example, optical energy, based on an interaction between two sources, such as a control source and a source representing data. As discussed below, the gate 100 may permit the selective application of higher energy to an output port based on the timing and configuration of inputs by interaction of the inputs and without the requirement for a state change of the gate 100. A discussion of various embodiments that exhibit this behavior follows the discussion of FIGS. 1a, 1b, 1c, and 1d.

Referring to FIG. 1a, a gate 100 has two inputs 5 and 10 and is configured such that when compatible energy signals are received simultaneously at the inputs 5 and 10, responsive outputs, at an output port 15, is obtained. For example, the inputs may be optical energy pulses whose phases are aligned to constructively interfere within the gate 100 or light beams whose polarization angles are in a predetermined relationship relative to each other and to filters within the gate 100. The gate 100 may be further configured such that if the energy received at the inputs has some other relationship (polarization angles, phase, or relative timing, for example) then a different output is obtained. The gate 100 may also, in embodiments, be configured to generate a different output signal at another output, for example output 20 where some of the energy is directed. For example, when a different relationship between the signals received at the inputs 10 and 5 exists, different signals may be output at such an additional output 20. Although only one additional output 20 is shown, more may be provided, depending on the embodiment.

In FIG. 1a, an input signal 40 includes an input symbol, represented here by a pulse 35 applied to input 5 of the gate 100. A second input 10 receives a different input symbol, represented here by the absence of a coinciding pulse (i.e., no input signal). An output signal 60, and where present other output signals represented by output 63, are responsive to the input signals. Here the output signals are represented by pulses 70 and 80 generated at outputs 15 and 20, respectively. The output signals are detected by sensors 90 and 95. Although gate 100 has two outputs 15 and 20 from which signals 60 and 63 are emitted and detected by sensors 90 and 95, respectively, a greater or lower number of outputs may be provided as will be clear from the discussion of specific embodiments below.

Figure 1C:
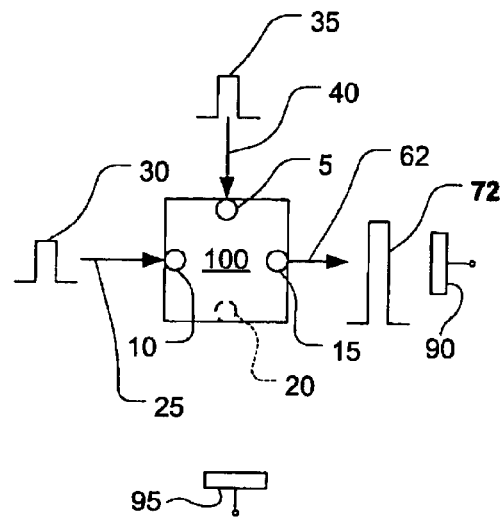
Figure 1B:
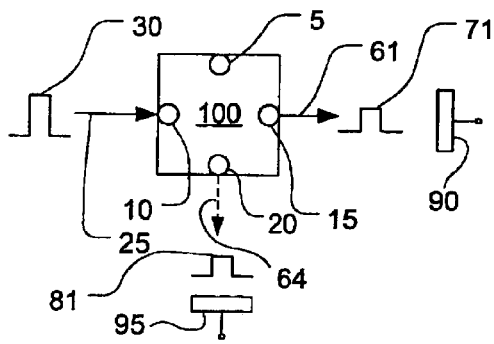

Referring now to FIG. 1b, the inputs signals change. Here, a different input signal 25 is represented by a pulse 30 applied to the input 10 of the gate 100 and no signal at input 5. A changed output signal 61 is represented by a pulse 71 generated at the output 15. In the illustrated case, the output may be substantially the same whether there is a pulse at input 5 or at input 10, but not coincident. Referring to FIG. 1c, when pulses 30 and 35 are applied to both inputs 10 and 5, respectively, a different output 62 results, which includes a pulse 72, which is different from either pulse 70 or 71.

By providing an appropriate detector, such as, detector 90, to the gate 100, it can be determined whether a signal was applied to either input 5 or 10 independently or to both in a certain temporal relationship. This may be determined by detecting the presence of a pulse 72 versus either pulse 70 or 71, for example, by comparing an intensity level of the respective pulses. Thus, for example, if a receiver is configured to detect only pulses of the form 72, a signal modulated to carry data and applied at one of the inputs 5 or 10 may be detected as such at the output 15 only when a "control signal" is applied at the other input 10 or 5 simultaneously and respectively. In this case, for example, a data signal at input 5 may be considered to be passed or blocked depending on the coincidence of a signal at input 10. Thus, one of the inputs can be regarded as a control input and the other as a data input. In FIG. 1c, signals 25 and 40 might be coherent and the relative phase between them might be adjusted in a way that output 20 might not emit any radiation. Note that, depending on the nature of the signals applied at ports 5 and 10, which output is used as the output of interest may be changed. For example, the phase relationship between the input signals 25 and 40 may affect which port 15, 20 would be better used as a more effective one for signaling.

Figure 1D:
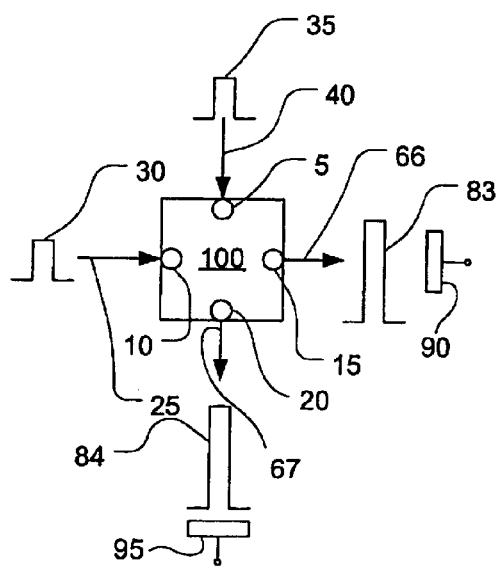

FIG. 1d illustrates a configuration, similar to that of FIG. 1c, except both outputs, 15 and 20, are used for signaling. The nature of the signals applied at ports 5 and 10 may create useful signals at both outputs 15 and 20 that may be in a form of signals 83 and 84 carried by beams 66 and 67, respectively. For example, the relative phase between beams 25 and 40 may determine at which output port an enhanced output due to constructive interference appears.

II. Dielectric Beam Splitter Embodiment

Referring to FIGS. 2a, 2b, and 2c, an embodiment of a device that may exhibit behavior such as gate 100 is a dielectric beam splitter 110. In such an embodiment, the inputs are optical energy. One input 115 (the relative strengths of all inputs and outputs are represented by a complex number indicating relative peak amplitude of their electric fields E-field) is a beam incident from one angle, which results in the generation of reflected and transmitted output ports 112 and 113 with output signals 145 and 150. The phase of the reflected output 150 is shown as $\pi/2$ radians ahead of that of the input 115 to indicate that a relative change of phase occurs depending on the presence and phase of a second input 160. Each output in FIG. 2a has an intensity of about half that of the input beam intensity due to the effect of the beam splitter 110. The intensity is proportional to the square of the E-field. In FIG. 2b, the input 160 includes pulse 155 whose phase is shown arbitrarily as being $\pi/2$ radians behind of that of the input 115, produces a similar result of two output signals 165 and 170 emanating from output ports 112 and 113, respectively. The intensities of each of these output signals is about half that of the input 160. Each of the inputs may include respective pulses 125, 155 as illustrated.

1. Coherent and Non-coherent Energy

It is assumed that the energy incident on the dielectric beam splitter 110 consists, at least substantially, of a single wavelength of light, although, as discussed below, in further embodiments, they consist of non-coherent radiation such as multiple wavelengths, propagation modes, phases or any combination of them. Where the light signals are non-coherent, the power combination effect is correspondingly different with simple power summing, rather than field summing, taking place.

2. Coherent Summing Description

Referring to FIG. 2c, when inputs 175 and 180 are incident simultaneously on the dielectric beam splitter 110, an output 197 is generated at output port 112 whose field corresponds to the sum of power of the two inputs 180 and 175. The intensity of the pulse 190 of output 197, being proportional to the square of the field amplitude, is thus four times the intensity of either output 145, 150 165, 170 when only one input signal 115, 160 is applied alone. If an incident signal 115 or 160 contains a pulse 125, 155, then the amplitude of an output pulse 135, 140, 136, 141, is half that of the input pulse 125, 155 when the latter is incident alone. If incident input signals 175 or 180 contain pulses 185, 195, then the amplitude of an output pulse 190, is twice that of either input pulse 185, 195 when the pulses 185, 195 are incident simultaneously. If the beam 197 is taken as the output, the behavior of dielectric beam splitter 110 can be seen to fall within the description of the gate 100 (FIGS. 1a–1d).

3. Coincidence: Outputs/Power Ratio

Note that the output may be taken as 145, 165 or 150, 170 as well and still fall within the description of the gate 100, depending on the interpretation of the received signal, the relative phase between input beams 115 and 160, and how data is represented. When using coherent energy, such as light, the energy ratio between the energy of the coincidence pulse, at the coincidence output, and the energy of the non-coincidence pulse at that output is up to four. When using non-coherent light this ratio is up to two. The differences between the above ratios is due to the fact that when using coherent light the control device (gate 100) acts as a field combiner while it acts as a power combiner when using non-coherent light. In addition, when using coherent radiation, the coincidence signal is produced at only one output and the non-coincidence signal is null. Thus the energy that is divided between two outputs, in a non-coincidence situation, is emitted from only one output, in a coincidence situation.

4. Coincidence: Change Output by Phase

Note that if the phase of either input signal 175 or 180 is changed by π, the coincidence output pulse will emanate from the port 113 rather than the port 112. This effect may be used to "direct" the coincidence pulse 190 based on a phase encoding of one or both of the input signals. As will be discussed below, this along with the selective gating effect may be used to perform a communications function as performed by a switch or multiplexer/demultiplexer.

III. Metallic Beam Splitter Embodiment

Referring to FIGS. 3a, 3b, and 3c, a further embodiment of a device that may exhibit behavior such as gate 100 is a metallic beam splitter 210. In this embodiment, again, the inputs are assumed to be optical energy with the electric field represented by vectors in complex coordinates. The field magnitude is indicated by a number near the field vector. One input 215 is a beam incident from one angle, which results in the generation of reflected and transmitted outputs 245 and 250. Some loss of energy occurs in the material of the metal film of the beam splitter so the sum of the power of the outputs 245 and 250 is about half that of the input 215. The phase of the reflected output 250 is shown as π radians ahead of that of the input 215, which is typical of reflection from a metal. Output energy 245 is transmitted by metal beam splitter 210 due to the tunneling effect and thus suffers from attenuation. The metal attenuation can be adjusted by varying the metal thickness. The type of metal and its thickness are chosen to produce 50% attenuation and 50% reflectance. In FIG. 3b, the input 260 whose phase is shown arbitrarily as being π radians ahead of that of the input 215, produces a similar result of two outputs 265 and 270 whose intensities are about a quarter that of the input 260. Outputs 265,270 adjusted to have the same intensity and equal to quarter of the input intensity. This adjustment is done by choosing the reflectivity of the metal to be equal to its attenuation. Each of the inputs may include respective pulses 255 and 225, as illustrated. Again, it is assumed that the energy incident on the metallic beam splitter 210 consists, at least substantially, of a single wavelength of light, although, as discussed below, in further embodiments, they consist of non-coherent radiation that may contain multiple wavelengths, propagation modes, phases, or any combination of them.

1. Coincidence: Outputs/Power Ratio

Referring to FIG. 3c, when inputs 275 and 280 are incident simultaneously on the metallic beam splitter 210, outputs 282, 297 are generated whose fields are equal to that of either input 280 and 275. The intensity of the outputs 282, 297 is higher by a factor of four relative to the outputs 265, 270, 245, 250 because no loss occurs in the metal when the phases of the incident beams 275 and 280 are in a particular relationship and coincident on the beam splitter 210 as illustrated. The loss in the metal is reduced, in coincidence, due to a free path created by the joint and overlap between the two skin-depths on both sides of the metal, which are produced simultaneously by the two beams that coincide. If incident signals 215 or 260 contain pulses 225, 255, then the amplitude of any output pulse 235, 240, 267, 277, is a quarter that of the input pulse 225, 255 when the latter is incident alone. If incident signals 275 or 280 contain pulses 285, 295, then the amplitude of an output pulse 290 (or 287), is equal to that of either input pulse 285, 295 when the pulses 285, 295 are incident simultaneously. When using coherent light, the energy ratio between the energy of the coincidence pulse, at the coincidence output, and the energy of the non-coincidence pulse at that output is up to four as a result of field combining. When using non-coherent light this ratio is up to two as a result of power combining and no change of the loss in the metal of the beam splitter. If the beam 282 (or 297) is taken as the output, the behavior of metallic beam splitter 210 can be seen to fall within the description of the gate 100 (FIGS. 1a–1d).

IV. Dual Grating Embodiment

Figure 4A:
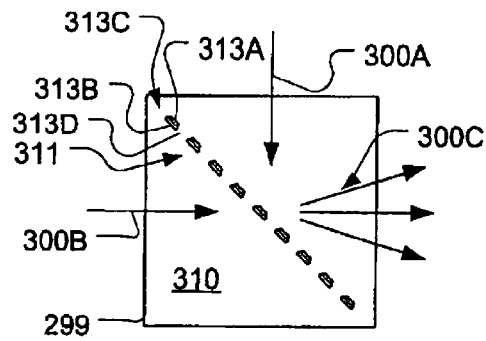
FIGS. 4a–4e are schematic illustrations of output signals produced by a dual grating according to input signals received at its inputs.

Referring now to FIG. 4a, a dual grating device 310 has a grating 311, illustrated within a prism 299. The grating has intermittent reflective 313A surfaces. Light beams 300A and 300B incident from opposite sides of the grating 311 generate a diffraction pattern 300C that, for example, is of one order when only one beam 300A or 300B is incident and of another when both beams 300A and 300B are simultaneously incident. This is because when beam 300B is incident alone, light passes through only the gaps 313D between grating elements 313C and when beam 300A is incident alone light is reflected only from the reflective surfaces 313A. As a result, the effective grating pitch is of a certain order and substantially the same due to the identical spacing of reflective surfaces 313A and gaps 313D. However, when both beams 300A and 300B are incident, the effective grating pitch is doubled because the gaps 313D are interleaved with the reflective surfaces 313A.

Figure 4B:
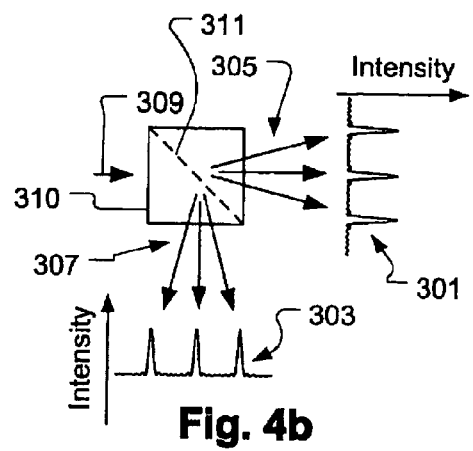
Figure 4C:
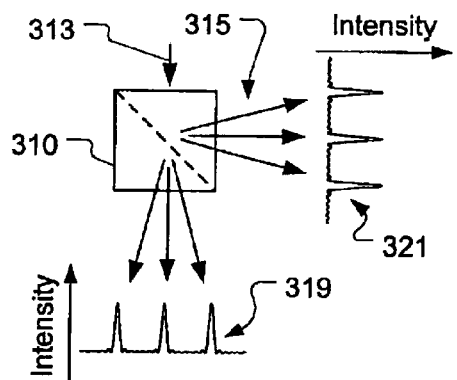
Figure 4D:
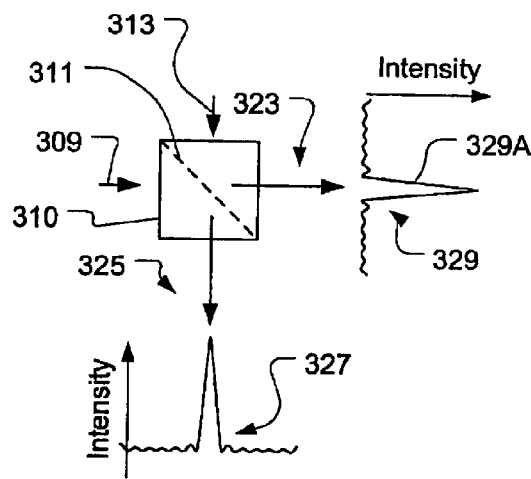

Referring to FIGS. 4b, 4c, and 4d, yet a further embodiment of a device that may exhibit behavior such as gate 100 (FIG. 1) is a dual grating 310. In this embodiment, again, the inputs are assumed to be optical energy. One input 309 is a beam incident from one angle, which results in the generation of reflected and transmitted outputs 307 and 305. The resulting interference patterns 301 and 303, may have three lobes if the wavelength of the light and the grating 311 pitch are appropriately selected. As shown in FIG. 4c, a similar result obtains if a beam 313 is incident from another angle with transmitted and reflected interference patterns 319 and 321 being generated. Again, it is assumed that the energy incident on the dual grating device 310 consists, at least substantially, of a single wavelength of light, although, as discussed below, in further embodiments, they consist of multiple wavelengths, modes, or phases.

1. Coincidence: Outputs/Power Ratio

Referring to FIG. 4d, when inputs 309 and 313 are incident simultaneously on the dual grating device 310, an interference pattern 329 of lower order is generated. If the pitch of the grating 311 is selected appropriately as well as the phase between beams 313 and 309, the intensity of a given part of the interference patterns 329, 327, produced when both inputs 309 and 313 are incident simultaneously, may be four times greater than of interference patterns 301, 321, 303, 319 produced when either of beams 313 or 309 is incident alone. Illustrated is the situation for zero and first order interference patterns where the central lobe of the interference pattern exhibits this effect. If incident signals 309 and 313 contain pulses then the amplitude of a corresponding output pulse has a first magnitude when the latter is incident alone. If incident signals 309 and 313 contain pulses then the amplitude of an output pulse having four times the first magnitude when the pulses are incident simultaneously. If light from the central lobe 329A is collected and treated as an output, then the behavior of the dual grating device 310 can be seen to fall within the description of the gate 100 (FIGS. 1a–1d).

The intensity of the lobes in interference patterns 301, 303, 319, 321, 327, and 329 are schematically illustrated and do not represent the actual relative intensity of the lobes where, actually, the side lobes are smaller than the central lobe. The transmitting gaps 313D and the reflecting elements of surface 313A can be broadened to convert grating 310 into transmitting and reflecting binary grating. In such a case the side lobes has half of the intensity of the central lobe.

When using coherent light the energy ratio between the energy of the coincidence pulse, at the coincidence output, and the energy of the non-coincidence pulse at that output is up to four as a result of the reduction of the number of lobes due to field interference. When using non-coherent light the number of lobes in the interference pattern does not change and the above ratio is up to two as may be predicted since the energies are summed.

Figure 4E:
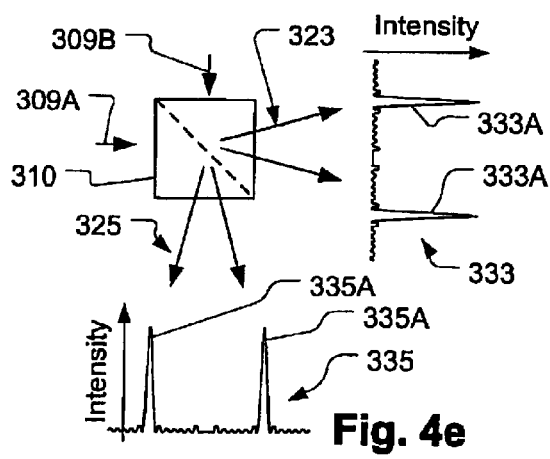

Referring now to FIG. 4e, when the relative phases of the input signals are changed by $\pi$, the interference patterns 333 and 335 corresponding to coinciding inputs 309A and 309B will change from a single lobe 329A to two large lobes as indicated at 333A and 335A. The total energy output during coincidence and non-coincidence follows the same relationship, but the energy is divided between two lobes. With suitably located optical pickups and a combiner, for picking up the total energy in the pair of lobes, e.g., 333A, and one located to pick up the energy in a single lobe such as at 329A, this effect may be used to "direct" the coincidence pulse 190 based on a phase encoding of one or both of the input signals. As will be discussed below, this along with the selective gating effect may be used to perform a communications function as performed by a switch or multiplexer/demultiplexer.

V. Y-Junction Embodiment

Figure 5A:
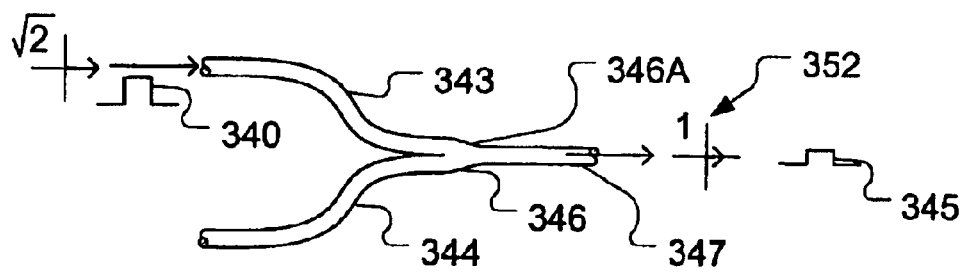
FIGS. 5a–5c are schematic illustrations of output signals produced by a Y-junction coupler according to input signals received at its inputs.
Figure 5B:
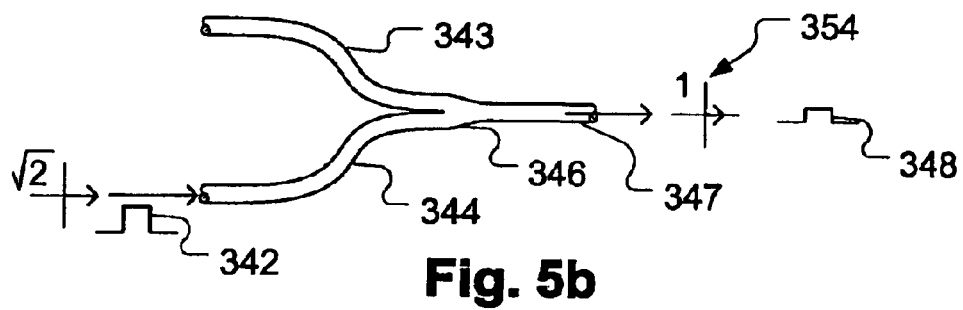
Figure 5C:
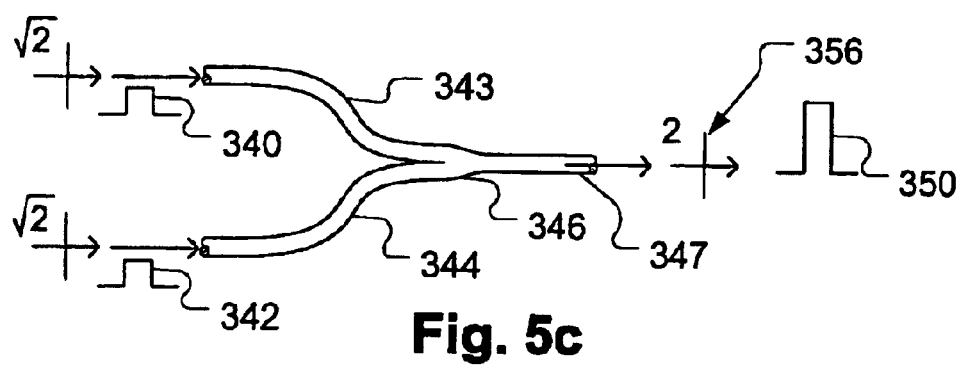

Referring to FIGS. 5a, 5b, and 5c, an optical Y-junction 346 may also exhibit the described properties of the gate 100 of FIGS. 1a–1d. A first input signal 340 may be applied to a first leg 343 with no coincident signal applied to the second leg 344. An output signal 345 may-have an intensity magnitude of half that of the input signal 340. Similarly, a second input signal 342 may be applied to the second leg 344 with no coincident signal applied to the first leg 343. In that case, again, an output signal 348 may have an intensity magnitude of half that of the input signal 342. Note that half of the energy is lost to the second propagation mode, in the coupling region 346A, and constitutes a loss, from the device at output 347. When both input signals 340 and 342 are incident simultaneously and in phase, the magnitude of an output signal 350, at output 356, may be sum of the magnitudes of the input signals 340 and 342. In the latter case, the energy in inputs 340 and 342 is coupled only to the first propagation mode, in junction 346A, and all propagates through output 347. Accordingly, when using coherent radiation, the energy of the coincidence output pulse 350 is up to four times higher than the non-coincidence pulses 345, 348, depending on the relative phases of inputs 340 and 342. When using non-coherent radiation for pulses 340, 342 the energy of the coincidence pulse 350 is only up to twice the energy of pulses 345, 348. Vector diagrams 341, 339, 352, 354, and 356 are vectorial presentations of signals 340, 342, 345, 348, and 350, respectively. The values accompanied to the vector diagrams indicate the field amplitudes of the vectors corresponding to the signals that they represent.

1. High Pitch Grating Embodiment

Referring to FIGS. 6a, 6b, and 6c, yet another embodiment of a device that may exhibit behavior such as gate 100 of FIGS. 1a–1d is a high pitch grating 360 device with a high-pitch grating 360A within a transparent prism 360B. In this embodiment, the inputs 361 and 363 are, again, optical energy. One input 361 (as in the embodiment of FIGS. 2a–2c, the relative strengths of all inputs and outputs are represented by a complex number indicating relative peak amplitude of their electric or magnetic fields) is a beam incident from one angle, which results in the generation of reflected and transmitted outputs 366 and 370 from output ports 379 and 377, respectively. The phase of the reflected output 366 from the port 377 is shown as $\pi$ radians behind that of the input 361 as should be for a reflection from a metal. Transmitting and reflecting metal grating 360A is a zero order grating, which means that its transmitting openings are smaller than the radiation wavelength. Thus, the openings behave as a metallic waveguides near cutoff conditions and produce small attenuation and a phase shift of $\pi/2$ radians, to transmitted output 370, relative to input 361. Each output in FIG. 6a has an intensity of about half that of the input beam intensity 361 due to the effect of the grating 360A, and the fact that the intensity is proportional to the square of the E-field. In FIG. 6b, the input 363 whose phase is shown arbitrarily as being $\pi/2$ radians out of phase with input 361, produces a similar result of two outputs 374 and 376 whose intensities are half that of the input 363. Each of the inputs 361 and 363 may include respective pulses 362, 372 as illustrated. Again, it is assumed that the energy incident on the grating device 360 consists, at least substantially, of a single wavelength of light, although, as discussed below, in further embodiments, they consist of multiple wavelengths or other forms of non-coherent radiation. While the radiation transmitted by grating 360A may suffer attenuation, it still can have an intensity that is equal to the intensity of radiation reflected from grating 360A. Equalizing the intensities of reflected from and transmitted through grating 360A can be done by selecting the reflectivity, the gap size, and the thickness of grating 360A.

2. Coincidence: Outputs/Power Ratio

Note that the port from which the coincidence pulse emerges 377 or 379 can be selected based on the phase relationship of the input signals 361 and 363. As in the embodiments of FIGS. 2a–2c and FIGS. 4a–4e, when the phase difference between the input signals 361 and 363 is changed by $\pi$, the port from which the coincidence pulse emanates switches. In the further embodiments discussed below, it should be understood that the phase-selection may be obtained by suitable change in the phase of one or both inputs and it will not be specifically referred to in the attending discussion.

Referring to FIG. 6c, when inputs 361 and 363 are incident simultaneously on the grating device 360, an output 376 is generated whose field corresponds to the sum of power of the two inputs 361 and 363. The intensity of the output 376 is thus four times the intensity of either output 366, 370, 376, 374 when only one input signal 361, 363 is applied alone. If an incident signal a pulse 362, 372, then the amplitude of an output pulse 354, 368, 375, 380 is half that of the input pulse 361 and 363 when the latter is incident alone. If input pulses 362 and 372 are incident together, the amplitude of an output pulse 378 is twice that of either input pulse. Thus, the grating device 360 can be seen to fall within the description of the gate 100 (FIGS. 1a–1d). Note that the output 374 may be taken as the output and still fall within the description of the gate 100, depending on the interpretation of the received signal and how data is represented. In the other embodiments discussed above employing gate 100 (FIGS. 1a–1d), grating 360A can be used with non-coherent light to produce a coincidence signal so that its coincidence signal intensity is up to double the non-coincidence signal.

VI. Waveguide Dual Grating Embodiment

Referring to. FIG. 7a, an alternative structure for creating the low and high order interference patterns exhibited by the grating of device 310 of FIGS. 4a–4d uses an array of interleaved light guides 391 to project a diffraction pattern 383 whose order depends on the coincidence of two inputs 385 and 387. The first input 385 directs light into one set of light guides 389A which are established at a first spacing. The second input 387 directs light into another set of light guides 389B which are established at the same spacing, but offset by one half that spacing from the first set and interleaved. When a light signal is applied to the first or second input 385, 387 a higher order interference pattern results than when both receive light signals simultaneously. The behavior of this embodiment in conformance with the description of the gate 100 is substantially as discussed with respect to the embodiment of FIGS. 4a–4d. Phase shifter 395 and 397 ensure that the proper phase relationships exist at the grating output. Phase shifter 395 and 397 may be of various types, such as, stretchers or thermal phase-shifters.

1. Phase Control

Figure 7B:
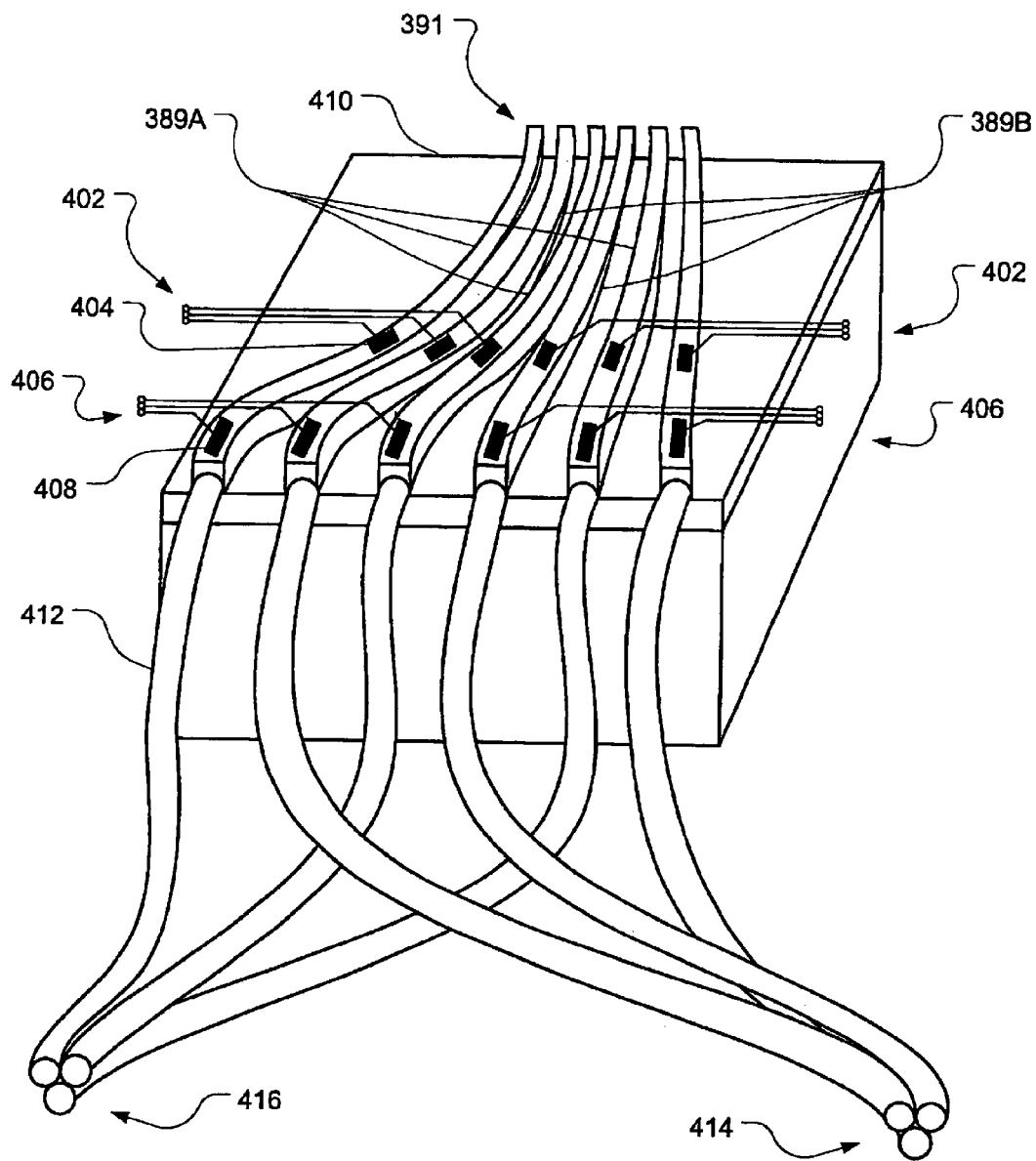
FIG. 7b is a schematic illustration of an interference device made of an array of planar guides.

Referring now also to FIG. 7b, the light guides 389A and 389B may be fabricated as laminar waveguide structures 389A and 389B using lithographic techniques on a substrate 410 for mass production. Since, in all of the above embodiments discussed above, the maintenance of a precise phase relationship may be essential, adjustable delay portions (phase shifter) as indicated for example at 408 may be formed on the waveguide structures 389A and 389B which are independently controllable via control leads 406 and 402. Various mechanisms for adjusting the index of refraction of materials suitable for waveguide structures 389A and 389B are known, for example, ones depending on the strength of an applied electric field or ones depending on temperature. Thus, the adjustable delay portions 408 (typ.; Note that the nomenclature "typ." which stands for "typical," indicates any feature that is representative of many similar features in a figure or in the text) may include appropriately treated materials and electrical contacts to permit the control of the phase of the signals such that the required interference effects are obtained. Fibers, for example as indicated at 412, are shown connecting the waveguides to input ports 414 and 416, however, the same function of routing may be provided by a three-dimensional lithographic techniques as well. Other optical optically-interference generating structures may be created to provide similar effects and the above set of embodiments is intended as being illustrative rather than comprehensive. All of the above drawings are figurative and features are exaggerated in scale to make the elements and their function clearer.

VII. Polarizing Beam Splitter Embodiment

Figure 8A:
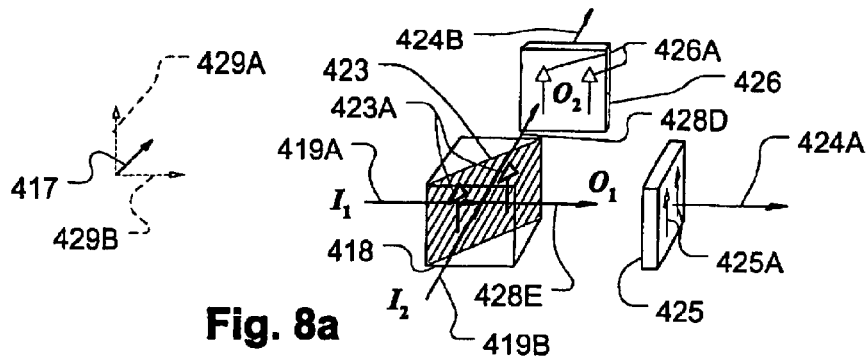
FIGS. 8a–8d are schematic illustrations of output signals produced by polarizing beam splitter according to input signals received at its inputs.

Referring now to FIG. 8a, a polarizing beam splitter device 418 includes a polarization filter 423 that transmits and reflects incident optical inputs 419A and 419B. An orientation of the polarization filter 423 is indicated by arrows 423A. As is known in the art, when an optical input 419A or 419B is transmitted through the polarization filter 423, the input field of beams 419A, 419B is reflected in proportion to the sine of the angle between the input's 419A or 419B polarization and that of the filter 423. That is, only the component of the input 419A or 419B polarization aligned with the filter's 423 polarization is transmitted, the remainder is reflected. In the figures that follow, an optical signal's polarization is indicated by an arrow as shown at 417 illustrated in Cartesian coordinate 429A and 429B, and that of the polarization filter 423 by arrows such as indicated at 423A.

Figure 8B:
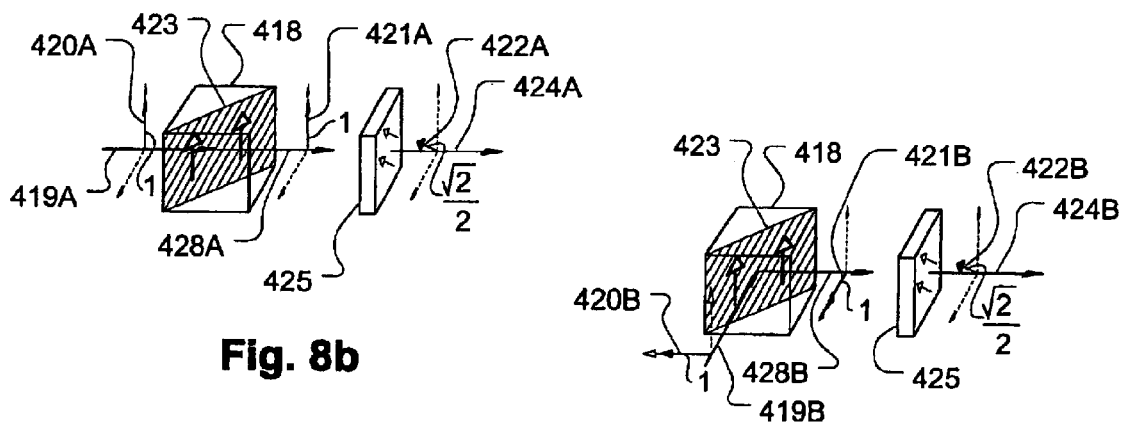
Figure 8C:
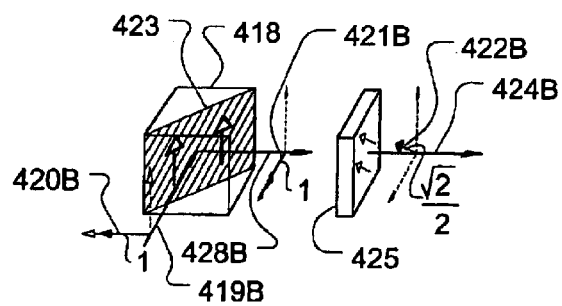
Figure 8D:
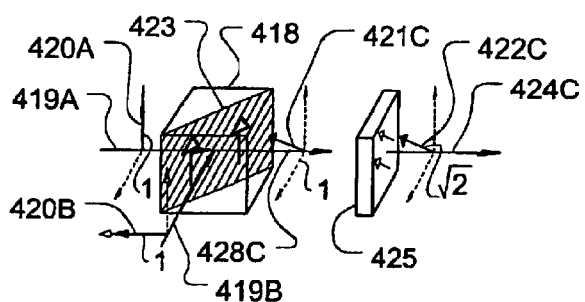

Further polarization filters 425 and 426, with respective orientations 425A and 426A, may be used to enhance the difference between coincidence and non-coincidence outputs. That is, the outputs 428E and 428D may be further filtered by polarization filters 425 and 426 to produce outputs 424A and 424B. Two input ports $I_1$ and $I_2$ and two output ports $O_1$ and $O_2$ are defined as illustrated. As discussed below, one of the two output ports $O_1$ and $O_2$ may be used alone as a selecting blocking gate or in combination so that the polarization device can be used as an output switch. In FIGS. 8b–8d, it is assumed that output port $O_1$ for purposes of discussion, but suitable orientation of the polarizations of the optical inputs generates the same behavior at the output port $O_2$. In particular, the output port behavior is switched each time the polarizations of both optical inputs 419A and 419B are rotated by $\pi/2$. As will become clear shortly, the present embodiment is thus similar to the embodiments of FIGS. 2a–2c, 3a–3c, 4a–4e, 6a–6c, and 7a, 7b, except that polarization is used for signal attenuation/augmentation.

Referring now to FIG. 8b, an optical input 419A with polarization 420A is applied to polarization filter device 418 with the polarization of the optical input 419A as indicated at 420A. The orientation of the polarization filter 423 is the same as that of the optical input 419A. Therefore, substantially all of the energy of the optical input 419A is transmitted as output 428A, with the polarization orientation, indicated at 421A, being the same as the optical input 420A. As indicated by the boldface numerals, the field amplitude of the optical input 419A and output 428A are both substantially the same and equal to 1 in arbitrary units.

The output 428A, according to a further embodiment, may be filtered by polarization filter 425 with the polarization orientation indicated. The latter, as shown, forms an approximately $\pi/4$ angle with the orientation of the polarization filter 425 so that the output signal 428A is attenuated accordingly, causing the magnitude of the output E-field 424A to be $\sqrt{2}/2$ and its orientation to be aligned with that of the filter 425 as indicated at 422A.

Referring now to FIG. 8c, an optical input 419B with polarization 420B is applied to polarization filter device 418 with the polarization of the optical input 419B as indicated at 420B. The orientation of the polarization filter 423 is perpendicular to that of the optical input 419B. Therefore, substantially all of the energy of the optical input 419B is reflected as output 428B, with the polarization orientation, indicated at 421B, being the same as the optical input 420B. As indicated by the boldface numerals, the field amplitude of the optical input 419B and output 428B are both substantially the same and equal to 1 in arbitrary units.

As in the embodiments of FIG. 8b, the output 428B, according to a further embodiment, may be filtered by polarization filter 425 with the polarization orientation indicated. The latter, as shown, forms an approximately $\pi/4$ angle with the orientation of the polarization filter 425 so that the output signal 428B is attenuated accordingly, causing the magnitude of the output E-field 424B to be $\sqrt{2}/2$ and its orientation to be aligned with that of the filter 425 as indicated at 422B.

Referring now to FIG. 8d, optical inputs 419A and 419B with polarizations 420A and 420B, respectively, are applied to polarization filter device 418 simultaneously. The polarizations of the optical inputs 419A and 419B are as indicated at 420A and 420B. The orientation of the polarization filter 423 is the same as that of the optical input 419A and perpendicular to that of optical input 419B. Therefore, the transmitted field of optical input 419A is combined with the reflected optical input 419B in the manner of the beam splitter embodiments and a combined output 428C obtained, with the polarization orientation, indicated at 421C, being the vector sum of those of the tow inputs 419A and 419B. The power of the output 428C is the sum of the powers of the optical inputs 420A and 420B. Therefore, its field amplitude is equal to √2, as indicated by the boldface numerals showing arbitrary units.

As in the embodiments of FIGS. 8b and 8c, the output 428C in FIG. 8d, according to a further embodiment, may be filtered by polarization filter 425 with the polarization orientation indicated. The latter, as shown, forms an approximately zero angle with the orientation of the polarization filter 425 so that the output signal 428C is not attenuated. Thus, the magnitude of the output E-field 424C is √2 and its orientation is aligned with that of the filter 425 as indicated at 422C.

1. Coincidence: Outputs/Power Ratio

As should be clear from the above discussion, an output 424C is obtained, when inputs 419A and 419B are coincident, whose intensity magnitude is four times that of the output 424A or 424B when either input 419A or 419B is incident by itself. This behavior is similar to embodiments previously discussed. If light having multiple frequencies or phases (or multimode light) is used, the polarization device 418 acts as a simple power summer rather than a field summer. Thus, the power of the output will not be as great as when coherent light, suitable phase-aligned, is used. As should also be clear from the properties of the polarization filter device 418, if the polarization angles of the inputs 419A and 419B are rotated by $\pi/2$ (in either direction), similar results will be obtained as above, except that instead of the outputs 428A, 428B, and 428C being generated at output $O_1$, they will be generated at $O_2$, such as illustrated by output 428D of FIG. 8a.

Using the configuration of FIG. 8d when polarization filter 425 is removed, resulting in a signal 424C, at the coincidence output, that its intensity, when beams 419A and 419B are applied simultaneously, is only twice the intensity when only one input of inputs 419A or 419B is applied.

2. Directional Coupler-Based Embodiment

Figure 8E:
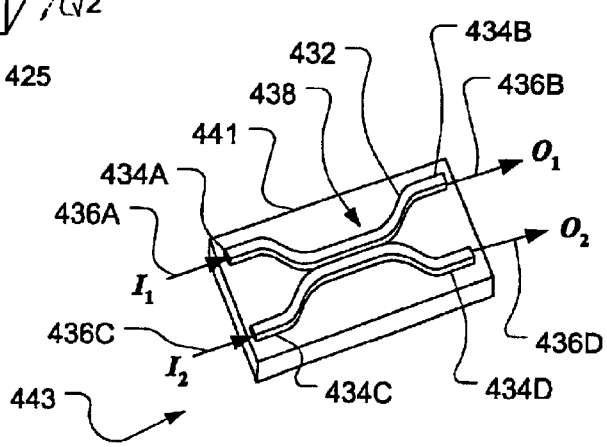
FIG. 8e is a schematic illustration of summing device made of a planar directional coupler.

FIG. 8e illustrates a directional coupler device 443. Device 443 is constructed from a directional coupler 438 that has two input ports $I_1$ and $I_2$ indicated at 434A and 434C, respectively, and two output ports $O_1$ and $O_2$ indicated at 434B and 434D, respectively. Waveguide portions 432 (typ.) interconnect the directional coupler 438 with the ports 434A through 434D as illustrated. The directional coupler device 443 may be formed on a substrate 441 using lithographic techniques or manufactured in any suitable manner as a discrete component or one of many on a single optical chip, as desired.

3. Coincidence: Outputs/Power Ratio

The directional coupler device 443 may also be used as a gate device conforming to the description for gate 100, as discussed with reference to Table 1, below.

TABLE 1

Field magnitudes of inputs and outputs for directional coupler-based gate

| | $I_1$ | $I_2$ | $O_1$ | $O_2$ | $Q_1$ Power |
|---|---|---|---|---|---|
| Field Magnitude/phase | √2 | 0 | 1 | j | 1 |
| | 0 | −√2j | 1 | −j | 1 |
| | √2 | −√2j | 2 | 0 | 4 |
| | 0 | √2 | j | 1 | 1 |

TABLE 1-continued

Field magnitudes of inputs and outputs for directional coupler-based gate

| $I_1$ | $I_2$ | $O_1$ | $O_2$ | $Q_1$ Power |
|---|---|---|---|---|
| −√2j | 0 | −j | 1 | 1 |
| −√2j | √2 | 0 | 2 | 0 |

When the indicated inputs $I_1$ and $I_2$ are applied in combination in a given row, the corresponding outputs $O_1$ and $O_2$ are given in the same row result. The phase relationships are relative and depend on the precise structure and materials of the directional coupler device 443, which determine delays, coupling length, etc. As will be clear to those of skill in the relevant fields, a structure may be created to provide the above behavior or a simile. As should be immediately clear, the ratio of power at output port $O_1$ when the input signals are coincident is four times that when one signal arrives at a time, as indicated in Table 1. Also, if the phases of the inputs are rotated by $\pi/2$, as indicated in the last three rows, the large coincidence output is generated at port $O_2$ instead of port $O_1$. When non-coherent radiation is used, both outputs $O_1$ and $O_2$ produce output signals, even when both inputs applied simultaneously, resulting in a coincidence output signal that its intensity is only up to twice the intensity when only one input is applied alone.

VIII. Coincidence Gates General Discussion

In general it should be understood that for all the embodiments described above (2a–2c, 3a–3c, 5a–5c, 4a–4e, 6a–6c, 7a–7b, and 8a–8e) in accordance to FIGS. 1a–1d, and when using coherent radiation, the coincidence output, when the two inputs are applied simultaneously, may produce a signal that its intensity is within a range between 0 up to four times the intensity when either input is applied alone. The coincidence output signal may be adjusted, to be at any intensity value within the above described range, by the relative phase and polarization between the two input beams. For non coherent radiation the intensity of the coincidence output, when the two input beams are applied together, may be higher up to twice the intensity, at this output, when either input beam is applied alone.

Accordingly, it can be seen that the above described summing gates, which are all represented by gate 100 of FIGS. 1a–1d, produce low and high level amplitude signals, at their coincidence output, corresponding to non-coincidence and coincidence states, respectively.

Thus the input state (coincidence or non-coincidence state) of gates 100 can be detected at their outputs by monitoring their output signal using detectors such as detectors 90 and 95 of FIGS. 1a–1d.

Alternatively, the input state of gates 100 can be detected at their outputs using threshold devices. The lower and the higher level signals at the outputs of gates 100, corresponding to non-coincidence and coincidence states at the inputs of gate 100, can be adjusted to be below and above the threshold level of a threshold device into which these signals are fed in order to detect the input states.

The use of a threshold device that follows the summing gate produces an AND logic gate that its output is in logic states "1" or zero when its inputs are in coincidence or non-coincidence states, respectively. The AND gate includes two major units, a summing gate (such as the summing gates 100 described above) and a threshold device (such as described below). The combination of summing gates with threshold devices to produce AND gates, is described, in details, below.

Threshold Devices

Figure 9A:
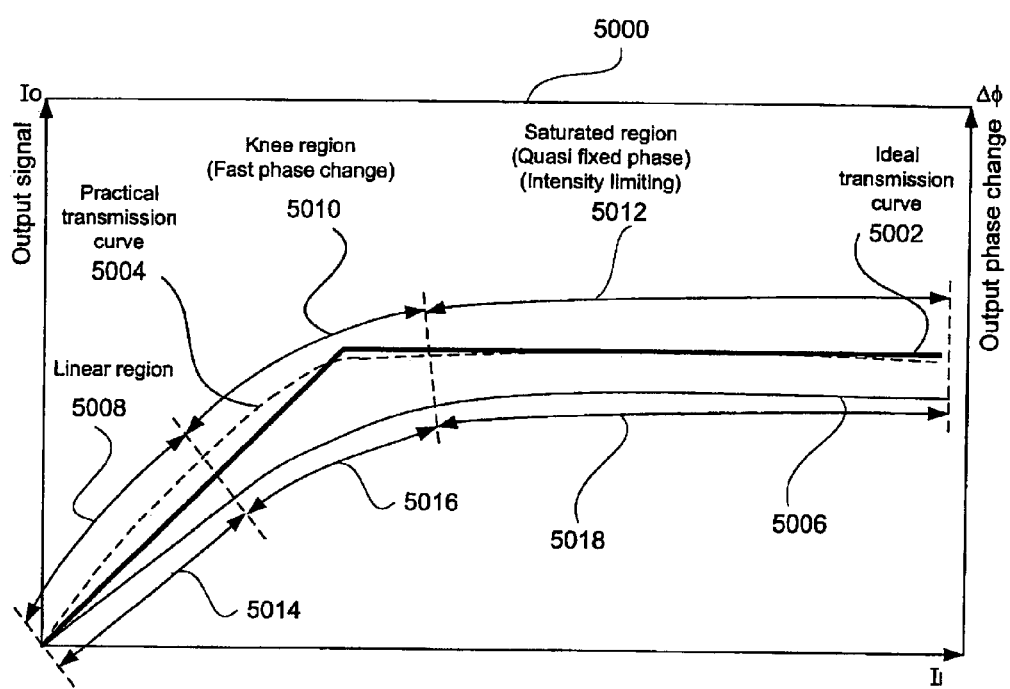
FIG. 9a is a schematic illustration of a graph showing relative phase shift and intensity of output signals of a Non Linear Element (NLE) as a function of signals input to the NLE.

FIG. 9a schematically illustrates a graph 5000 having coordinates of output intensity Io and output relative phase change Δφ versus input intensity Ii. Graph 5000 depicts ideal and practical transmission curves 5002 and 5004, respectively, illustrating the relationship between output and input intensities, Io and Ii, respectively, of a nonlinear medium, e.g., a Non-Linear Element (NLE) such as, for example, an optical amplifier, an Erbium Doped Fiber Optic Amplifier (EDFA), a Solid state Optical Amplifier (SOA), a Linear Optical amplifier (LOA), an optical limiter, or any other suitable nonlinear device or material. Curve 5006 schematically illustrates the relationship between the output phase change Δφ and the input intensity Ii in optical devices such as, for example, the above-mentioned amplifiers, limiters, or nonlinear media.

As shown in FIG. 9a, curve 5004 has a linear region 5008, a nonlinear knee region 5010, and a quasi-flat saturation region 5012. For relatively low level input signals Ii, in range 5008, the corresponding output signals Io are substantially linearly proportional to the input signal Ii. For intermediate levels of input signals Ii, e.g., in range 5010, the output signals Io are no longer linearly proportional to the input signals. For relatively high-level input signals Ii, e.g., in the range 5012, the output signals Io are saturated, generally fixed, and independent of the intensity of the input signals Ii.

Curve 5006 shows a phase change Δφ, which may correspond to a change of the refractive index ΔN, at the output of the non-linear device. The phase change Δφ depends on the change of the refractive index ΔN, the wavelength λ, and the length of the amplifier/limiter L. The phase change may be given by:

$$\Delta\phi = 2\pi/\lambda \Delta N_L \quad (1)$$

Thus, for fixed values of wavelength λ and length L, the phase change Δφ may be linearly proportional to the change of the refractive index ΔN.

At the range of low-level input signals, the output phase change Δφ depends linearly on the input signals Ii as indicated by range 5014, which corresponds to intensity range 5008. At the range of medium level input signals, the change of Δφ is a sub-linear function of the input intensities Ii, as indicated by range 5016 which corresponds to intensity range 5010. At the range of relatively high input signals, the output phase shift Δφ is saturated and is almost fixed and does not depends on the input intensities Ii, as indicated by range 5018, which corresponds to intensity range 5012.

Figure 9B:
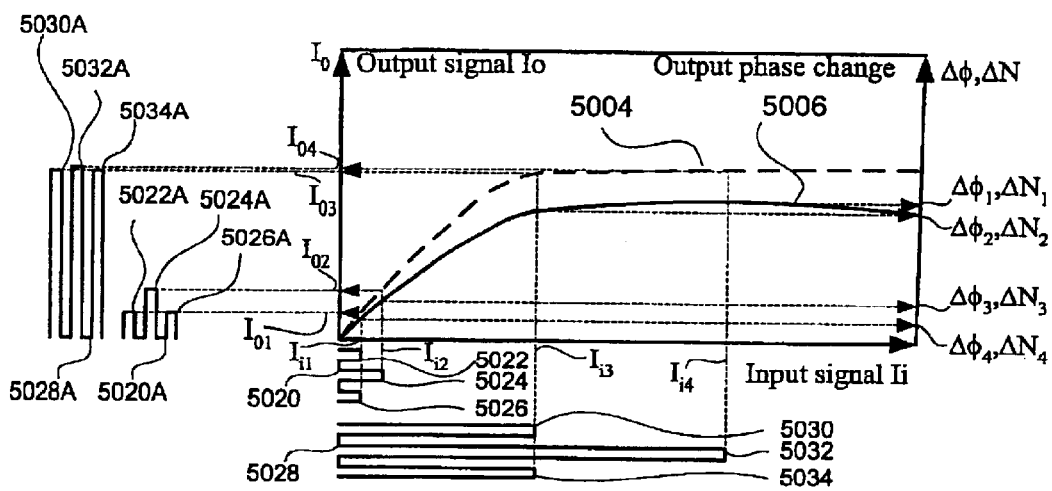
FIGS. 9b and 9c are schematic illustrations of relative phase shifts and output signal intensities as in the graph of FIG. 9a, as applied to different input pulse patterns.

FIG. 9b schematically re-illustrates transmission curve 5004 of FIG. 9a, where with exemplary output signals Io versus input signals Ii are indicated, as well as curve 5006 of FIG. 9a, where exemplary output phase changes Δφ versus inputs signals Ii are indicated. FIG. 9b further illustrates the relationship between exemplary input signal patterns, 5020 and 5028, and their corresponding output signal patterns, 5020A and 5028A. In analyzing FIG. 9b and FIG. 9c for two different types of input signals, namely, low-level input signals within the linear range of the NLE (e.g., ranges 5008 and 5014 of FIG. 9a) and high-level input signals within the saturation range of the NLE (e.g., ranges 5012 and 5018 of FIG. 9a), the following observations are made:

Input signal pattern 5020 is a low level input signal and the pulses of signal 5020 (i.e., pulses 5022 and 5026 and pulse 5024), having intensities $Ii_1$ and $Ii_2$, respectively, are within range 5008 (or 5014) of FIG. 9a. Thus pulses 5022, 5024 and 5026 are transmitted linearly according to curve 5004, resulting in output signal pattern 5020A having intensities $Io_1$ and $Io_2$, respectively. The pulses of signal 5020A (i.e., pulses 5022A, 5024A and 5026A) are also within the linear range 5014 (or 5008) of FIG. 9a and are, thus, transmitted linearly according to curve 5006. As shown in FIG. 9b, the lower amplitude pulses 5022A and 5026A have a phase shift $\Delta\phi_1$ and the higher amplitude pulse 5024A has a phase shift of $\Delta\phi_2$. Since the pulses 5022A, 5024A and 5026A are all with low amplitudes, the phase shifts $\Delta\phi_1$ and $\Delta\phi_2$ are both very small. The difference $\Delta\phi_1 - \Delta\phi_2$ is even smaller and may be ignored for the purpose of the present invention. Accordingly, for the purpose of the present invention, the pulses 5022A, 5024A and 5026A of pattern 5020A may be considered to have substantially the same phase shift Δφ.

Input signal pattern 5028 represents an intensity amplification of signal pattern 5020. The pulses of signal 5028 (i.e., pulses 5030 and 5034 and pulse 5032), have intensities $Ii_3$ and $Ii_4$, respectively, and are within the high level, i.e., saturated, intensity range 5012 (or 5018) of FIG. 9a. Thus, pulses 5030, 5032 and 5034 are transmitted according to curve 5004 with quasi-equal intensities $Io_3$ and $Io_4$, and quasi-equal phase shifts Δφ3 and $\Delta\phi_4$, resulting in output pulses 5030A, 5032A and 5034A, respectively, of output signal pattern 5028A.

Figure 9C:
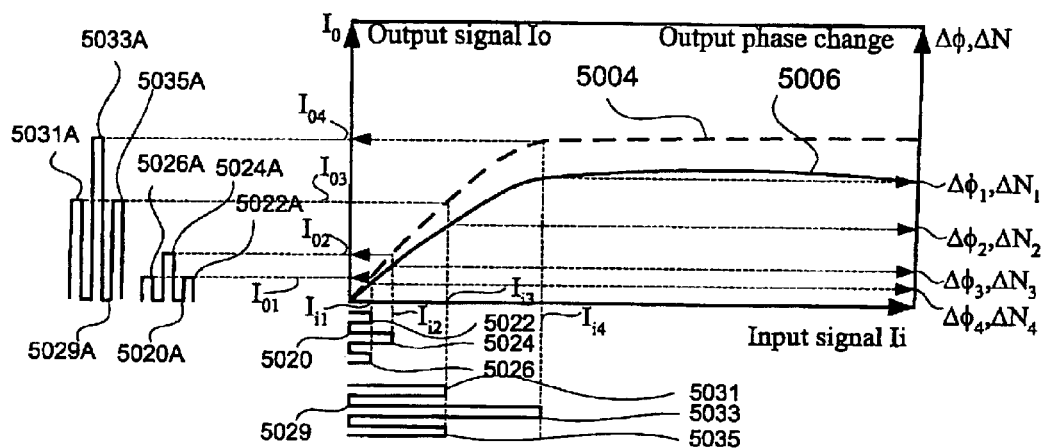

FIG. 9c schematically illustrates a graph similar to that of FIG. 9b, showing the same input and output patterns 5020 and 5020A; however, instead of amplified pattern 5028, FIG. 9c illustrates transmission of an input pattern 5029, which is produced by a lower amplification of input pattern 5020 than that of pattern 5028. Due to the lower amplification of pulse pattern 5020, only the higher amplitude 5033 of pattern 5029 has an intensity $Ii_4$ in the saturated region 5012 (or 5018) of FIG. 9a. However, the intensity $Ii_3$ of the other amplitudes, namely, the intensity of amplitudes 5031 and 5035, is within the linear region 5008 (or 5014) of FIG. 9a. Accordingly, the non-linear device applies a lower effective amplification factor to amplitude 5033 compared to the amplification factor applied to amplitudes 5031 and 5035, and results is larger phase difference, $\Delta\phi_4 - \Delta\phi_3$, between the output pulse 5033A and output pulses 5031A and 5035A of output pattern 5029A, respectively.

Figure 10A:
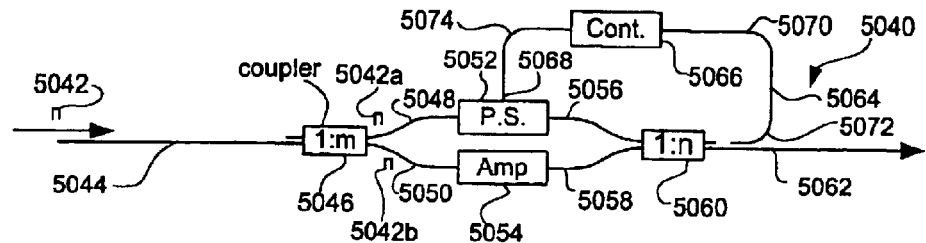
FIGS. 10a–10d are schematic illustrations of four, respective, exemplary designs of threshold devices according to exemplary embodiments of one aspect of the present invention, using an adaptation of a non-linear MZI.

FIG. 10a schematically illustrates a threshold device 5040 according to exemplary embodiments of one aspect of the present invention. The device illustrated in FIG. 10a may include a continuous sequence of optical components connected by light guiding media such as, for example, optical fibers, planar waveguides, or planar circuits (PLC) that may be fabricated using integrated optic techniques and/or on-chip manufacturing. Alternatively, device 5040 may be constructed from discrete components, in which case the optical fibers may be replaced by open space and the directional couplers, discussed below, may be replaced by beam splitters. A low level input pulse 5042 may propagate through input terminal 5044 of an asymmetric directional coupler 5046 having an amplitude splitting ratio of 1:m, wherein m may be any positive number). Coupler 5046 may split pulse 5042 into two pulses, 5042a and 5042b, which may propagating in separate output branches, 5048 and 5050, respectively. The normalized amplitudes of pulses 5042a and 5042b in branches 5048 and 5050 are thus m and 1, respectively, in relative units as defined herein. Pulse 5042a may propagate through phase shifter 5052 and may enter a directional coupler 5060 via an input branch 5056. Pulse 5042b may propagate through amplifier 5054 and may enter coupler 5060 via an input branch 5058. Phase shifter 5052 may be adjusted to produce a phase shift Δφ to ensure that pulse 5042a destructively interferes with pulse 5042b at an output port 5062 of coupler 5060. The amplitude gain G of amplifier 5054 may be adjusted to maintain an amplitude magnitude of pulse 5042b, at input branch 5058 of coupler 5060, that will cause pulses 5042a and 5042b to null each other by the destructive interference between them at output port 5062 of coupler 5060.

The phase shift $\Delta\phi$ produced by phase shifter 5052 may ensure that pulses 5042a and 5042b enter coupler 5060 with a phase difference of $\pi/2$ radians. This means that $\Delta\phi$ may compensate for the differences in optical paths caused by the differences between branches 5048 and 5050, the terminals of coupler 5046 and 5060, and the phase shift of amplifier 5054, which may include a SOA, LOA, or EDFA, as are known in the art, such that the relative phase between pulses 5042a and 5042b at output port 5062 of coupler 5060 will be $\pi$ radians. At the same time, input ports 5058 and 5056 of combiner 5060 contribute their amplitudes to output port 5062 in a ratio of 1:n, wherein n represents any positive number, respectively, to produce equal amplitude pulses with opposite phases. When the required conditions for $\Delta\phi$ and the amplitudes are maintained, the amplitude at port 5062 may be given by:

$$I_{5062} = 1 \times G - m \times n = 0 \tag{2}$$

To assure $I_{5062}$ will be zero, the amplification G of amplifier 5054 should be equal to m×n when n is the splitting/combining ratio of coupler 5060. Accordingly, in embodiments of the invention, both couplers 5046 and 5060 may be asymmetric couplers, wherein m, n≠1 and m×n=G). Alternatively, one of couplers 5060 and 5046 may be an asymmetric coupler while the other coupler may be a symmetric coupler, wherein either n=1 and m≠1 or m=1 and n≠1 and m×n=G. For example, when coupler 5060 is a symmetric coupler (i.e., n=1), gain G may be equal to m.

To compensate for possible changes in the relative phases of pulses 5042a and 5042b in coupler 5060 due to influence by external parameters, for example, environmental temperature changes, the relative phase may be controlled by a closed loop 5070 that may control phase shifter 5052 to maintain the proper phase shift $\Delta\phi$. A coupler 5072 may tap a fraction of the intensity from port 5062 into optical guide 5064, which may transmit the tapped light to a controller 5066, which may monitor the tapped light and produce a corresponding electronic control signal that may be sent via lead 5074 to electrode 5068. The electronic control signal may be used as feedback for adjusting phase shifter 5052. For the range of low-level input signal 5042, the output signal at port 5062 should be substantially zero. A substantially zero-level output may be maintained by closed loop control 5070 by adjusting shifter 5052 using controller 5066.

In embodiments of the invention, closed loop 5070 maintains the desired steady state phase relationship between the signals at ports 5056 and 5058, respectively. The response time of closed-loop phase control 5070 may be considerably longer than the time duration of the signals propagating in device 5040 and thus, the dynamic influence of loop 5070 on the phases of these signals may be negligible. To maintain the above mentioned steady-state conditions by sampling short-duration optical signals, controller 5066 may monitor and average the tapped light, e.g., by integration over a predefined range, producing an electronic control signal corresponding to the average of the optical signals, as tapped, arriving at optical guide 5064 from coupler 5072.

In the range of low-level input signals, the change of the phases produced by amplifier 5054 is small and there is no change in the amplifier gain G. This means that while gain G and phase shift $\Delta\phi$ of threshold device 5040 may be adjusted to produce a zero-level output signal for inputs at a certain low level amplitude, the amplifier actually maintains an output signal level of substantially zero in a range of low-level input intensities that includes the specific intensity for which device 5040 is adjusted to produce the zero-level signal. The range of low-level input intensities may be defined as the range of amplitudes below a certain amplitude level for which the threshold device may be designed to yield substantially zero-level output signals.

The magnitude of the amplitude for which the threshold device is designed to yield a zero-level output may be determined by the values of gain G and phase shift $\Delta\phi$. For amplitudes significantly higher than the above discussed low-level inputs, as discussed below with reference to FIG. 10b, gain G may be reduced to a saturated value $G_{sat}$ and the phase shift $\Delta\phi$ may be increased to a saturated value $\Delta\phi_{sat}$, i.e., the requirement for Equation 2 above are not fulfilled. Instead, in the range of high-level input signal, device 5040 may transmit the signals at a non-zero output level, which may be given by:

$$I_{5062} = 1 \times G - m \times n \neq 0 \tag{3}$$

Thus, the gain G and the phase shift $\Delta\phi$ may control the "turn on" point of the threshold device. The "turn on" (e.g., threshold) point may be defined as a point on the axis of input amplitudes (intensities) at which the transmission function of the threshold device, i.e., the output signal as a function of the input signal, begins to increase sharply.

Figure 10B:
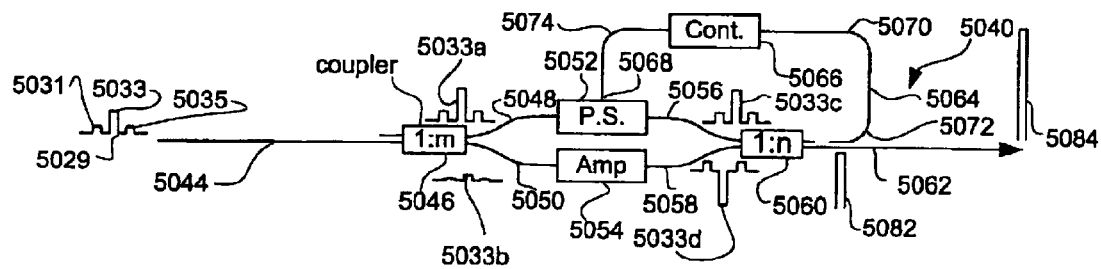

FIG. 10b illustrates threshold device 5040, as in FIG. 10a, but describes operation of device 5040 for both low and high level ranges of input signals that may be carried by input pulse pattern 5029. The input pattern signal 5029 may be as illustrated in FIG. 9c, i.e., it may include lower level pulses 5031 and 5035 with magnitudes within the linear range of amplifier 5054 and a higher-level pulse 5033 with a magnitude in the saturation range of amplifier 5054. Lower level pulses 5031 and 5035 of input pattern 5029 may have amplitudes substantially the same or similar to the amplitude of pulse 5042 in FIG. 10a. Accordingly, as explained above with reference to pulse 5042 of FIG. 10a, there would be substantially no output signal at port 5062 of device 5040 in response to input pulses 5031 and 5035. It will be appreciated that the above discussion relating to lower level input pulse 5042 is also applicable to lower level input pulses 5031 and 5035 in FIG. 10b.

In contrast to the low-level pulses, pulse 5033 may be split by coupler 5046 into two pulses, 5033a and 5033b, propagating along branches 5048 and 5050, respectively. The amplitude of pulse 5033a may be about m times higher than the amplitude of pulse 5033b; however, the amplitude of pulse 5033b is still in the saturation range of amplifier 5054. As explained above, in the saturation range, the gain $G_{sat}$ of amplifier 5054 may be much lower than gain G in the linear region. This means that, in the range of high-level input signals, the ratio between the amplitudes of pulses 5033d and 5033c, carried by input branches 5058 and 5056 of coupler 5060, respectively, may be much smaller than the ratio between these pulses in the range of low-level input signals. Accordingly, in contrast to the ratio maintained between pulses 5033d and 5033c to substantially null the output signal at port 5062 for the low-level input signals, the ratio between pulses 5033d and 5033c for the high-level input signals may be changed to a value which results in a significantly non-zero output signal at port 5062. In addition, the phase shift produced by amplifier 5054 in the saturated region may be much higher than the phase shift produced by the amplifier in the linear region. It can be seen from Equation 1 that the phase difference between pules 5033c and 5033d at inputs 5056 and 5058 of coupler 5060, respectively, may be reversed, e.g., from the value of π/2 radians for low-level signals to a value of −π/2 radians for the high-level signals, by appropriate selection of the length L of amplifier 5054. The phase difference between pulses 5033c and 5033d at inputs 5056 and 5058 of coupler 5060 may also be adjusted by adjusting the excitation level of amplifier 5054, which may determine the saturation level of the amplifier. Changing the polarity of the relative phase shift between pulses 5033c and 5033d, from a positive value at low-level signals to a negative value at high-level signals, results in a change from destructive interference to constructive interference, respectively, between pulses 5033c and 5033d at port 5062. This means that for low-level input signals, the output signals at port 5062 may "cancel out" by destructive interference, while the high-level input signals may interfere constructively to produce non-zero output signals at port 5062. Therefore, in this case, the phase difference between the pulses at the input terminals of coupler 5060 may be opposite the phase difference between the same terminals in the case of lower level input amplitudes (e.g., pulse 5042 of FIG. 10a or pulses 5031 and 5035 of FIG. 10b).

It should be note that, even if the phase difference between pulses 5033c and 5033d is not reversed, the output signal at output port 5062, i.e., the expression $I_{5062}=1 \times G_{sat}-m \times n$, may not be zero because $G_{sat}$ may not be equal to m×n. In addition, the phase difference between pulses 5033c and 5033d may be reversed, e.g., pulse 5033d may be drawn "upside down" relative to pulse 5033c, to indicate a reverse phase polarity, as schematically illustrated in FIG. 10b. Thus, for high-level input signals, the intensity at output port 5062 may be produced by constructive interference, rather than by destructive interference, when operating on low amplitude level signals. Accordingly, in the case of relatively high level input signals, an output signal 5082 at output port 5060 may be significantly different from zero and may be given by: $I_{5062}=1 \times G_{sat}+m \times n \neq 0$, where $G_{sat}$ is the amplitude gain at the saturated region of amplifier 5054.

In embodiments of the invention, output signal 5082 may be further amplified to any desired intensity to produce a stronger signal, represented by pulse 5084.

Figure 10C:
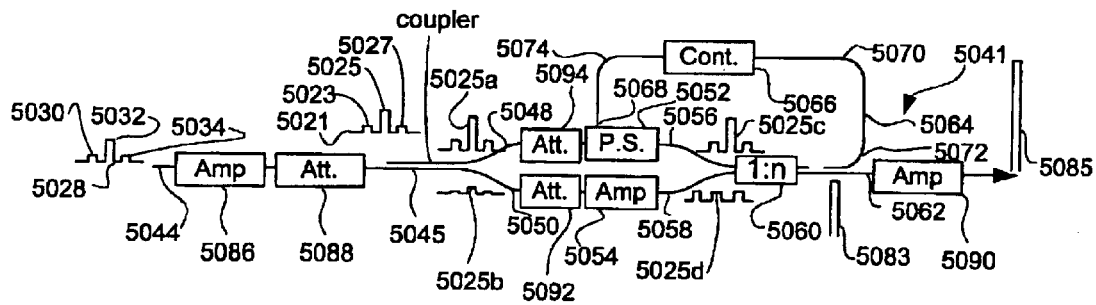

FIG. 10c illustrates a threshold device 5041, which is an exemplary variation of the threshold device 5040 illustrated in FIGS. 10a and 10b. In this variation, the 1:m directional coupler 5046 of FIGS. 10a and 10b is replaced with a symmetric directional coupler 5045 and the 1:m ratio between the amplitudes at branches 5050 and 5048, respectively, may be obtained by appropriately different attenuation of the two branches, e.g., using different attenuators 5092 and 5094, respectively.

Device 5040 of FIGS. 10a and 10b and device 5041 of FIG. 10c are described in accordance with two different operational design requirements. It should be appreciated, however, that appropriate adjustment of parameter settings in device 5041 may produce the threshold operation described above with reference to device 5040, and vice versa, as well as other threshold operations not explicitly described herein.

In device 5040 of FIGS. 10a and 10b, the output signals for higher level input signals are controlled by the gain and phase changes produced by amplifier 5054 when it is operated in the saturated region. In device 5041 of FIG. 10c, in contrast, the signals for the higher-level input signals may be controlled only by the change in the gain of amplifier 5054 when it is operated in its a deeply saturated range.

The input pulse pattern in the embodiment of FIG. 10c may be of a type such as pattern 5028 of FIG. 9b, i.e., of the type in which both the lower level input pulses 5030 and 5034 and the higher level input pulse 5032 are in the saturated range of amplifier 5054. To produce such an input, an amplifier 5086 may be used in conjunction with a variable attenuator 5088 to produce an amplifier with variable gain, whereby the input gain may be adjusted to convert pattern 5028 into the type of pattern 5021, which includes low-level pulses 5023 and 5027 and high amplitude pulse 5025. After amplification and attenuation (hereinafter: "net amplification") of input pattern 5028 into pattern 5021, if such amplification is needed, pattern 5021 may be split by coupler 5045 into pulses 5025a and 5025b, propagating in branches 5048 and 5050, respectively. In embodiments of the invention, the relative attenuations of attenuators 5092 and 5094 may be set to produce an amplitude ratio of 1:m between the signals at branches 5050 and 5048, respectively. The pulse pattern at branch 5050 may pass through amplifier 5054 when the lower level pulses have amplitudes within the saturation region of amplifier 5054. Thus, the pulse pattern may arrive at input 5058 of coupler 5060 with a gain of G' and with, e.g., the maximum possible phase shift that amplifier 5054 can produce. The pulse pattern at branch 5048 passes through phase shifter 5052 and may arrive at input 5056 of coupler 5060 with a phase shift as produced by phase shifter 5052, which may be adjusted to produce appropriately destructive interference between interfering pulses from inputs 5056 and 5058 at output 5062. In addition, the ratio of 1:m may be adjusted such that m may be equal to G'/n. Accordingly, the output signal for lower-level input signals of device 5041 may be given by: $I_{5062}=1 \times G'-m \times n=0$, where n is the splitting ratio of coupler 5060. For example, if coupler 5060 is a symmetric coupler (n=1), then G' may be equal to m.

With higher-level input signals, such as pulse 5032 of pattern 5028, the operation of device 5041 may be generally similar to its operation with lower-level input signals, except for a different gain of amplifier 5054. Since higher-level pulse 5025b is significantly within the saturated region, the gain of amplifier 5054 for this signal, G", may be different from gain G'. However, the phase shift produced by amplifier 5054 for pulse 5025b may be the same as the phase shift produced for the lower level pulses, and may be the maximum possible phase shift. Accordingly, high-level pulses 5025d and 5025c from inputs 5058 and 5056, respectively, may interfere destructively at output port 5062 as in the case described above of low-level pulses. However, in the case of high-level pulses, in accordance with embodiments of the invention, pulse 5025d may be amplified by amplitude gain G", which may be significantly lower than G', whereby output signal 5082 may be significantly different from zero and may be given by:

$$I_{5062}=1 \times G''-m \times n=G''-G' \neq 0.$$

Since, for higher-level input signals, device 5041 does not rely on phase inversion to produce an output signal 5083, in such a situation, the amplitude of the output signal may be smaller than the amplitude of output signal 5082 discussed above with reference to FIG. 10b. Accordingly, amplifier 5090 may be used to enhance pulse 5083 and, thereby, to produce a higher amplitude signal 5085.

In analogy to the control of the "turn on" point discussed above with reference to device 5040, the "turn on" point of device 5041 may also be adjusted by varying the values of the amplifier length L, the splitting ratios m and n and the saturated level of amplifier 5054, and/or by adjusting gains G' and G". The saturation level of amplifier 5054 may be varied by changing the excitation level of the amplifier, e.g., by adjusting optical pumping power in the case of EDFA and LOA, or by adjusting current injection level in the case of SOA. Accordingly, by adjusting the above mentioned parameters, e.g., the values of m, n, G', G", and the excitation level, it is possible to determine the amplitude for which the following equations are fulfilled:

$$I_{5062}=1 \times G'-m \times n=0 \text{ and } I_{5062}=1 \times G''-m \times n=G''-G' \neq 0 \quad (4)$$

The amplitude deduced from the value of G' in Equations 4 may be defined as the "turn on" point of device 5041.

Figure 10D:
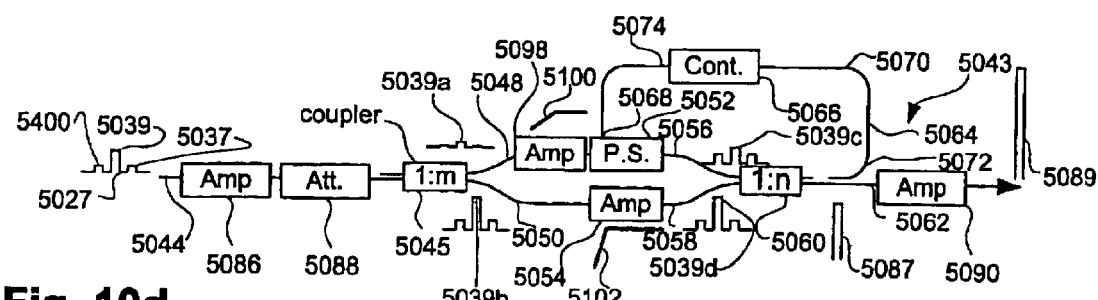
Figure 11A:
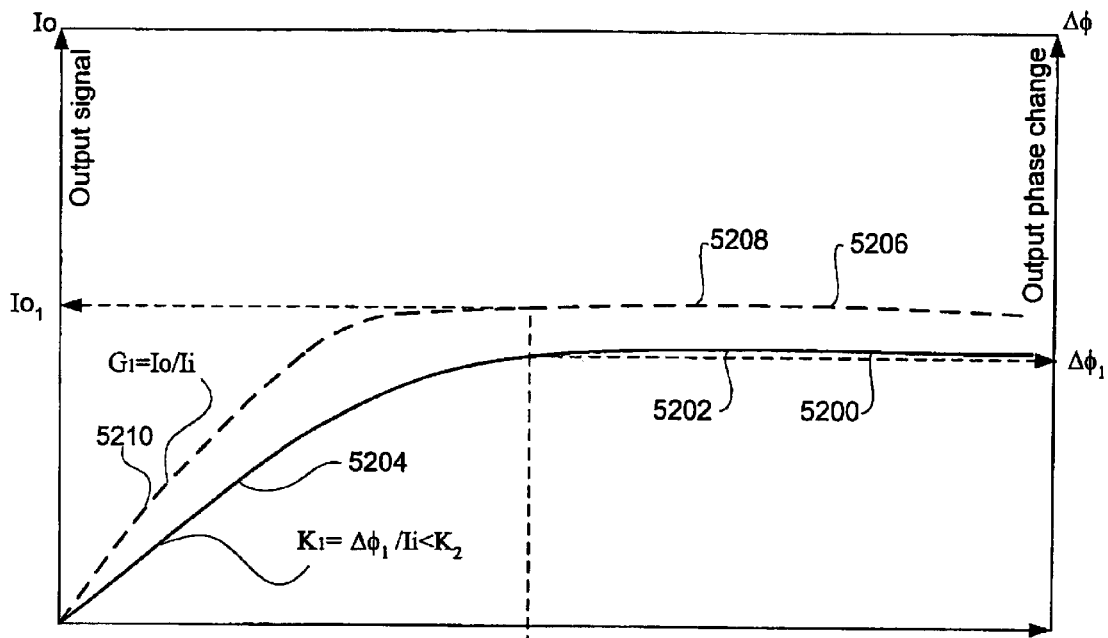
FIGS. 11a and 11b are schematic illustrations of the transmission functions of output intensities and phase shifts versus input intensities for an optical amplifier according to exemplary embodiments of the present invention at different excitation levels.
Figure 11B:
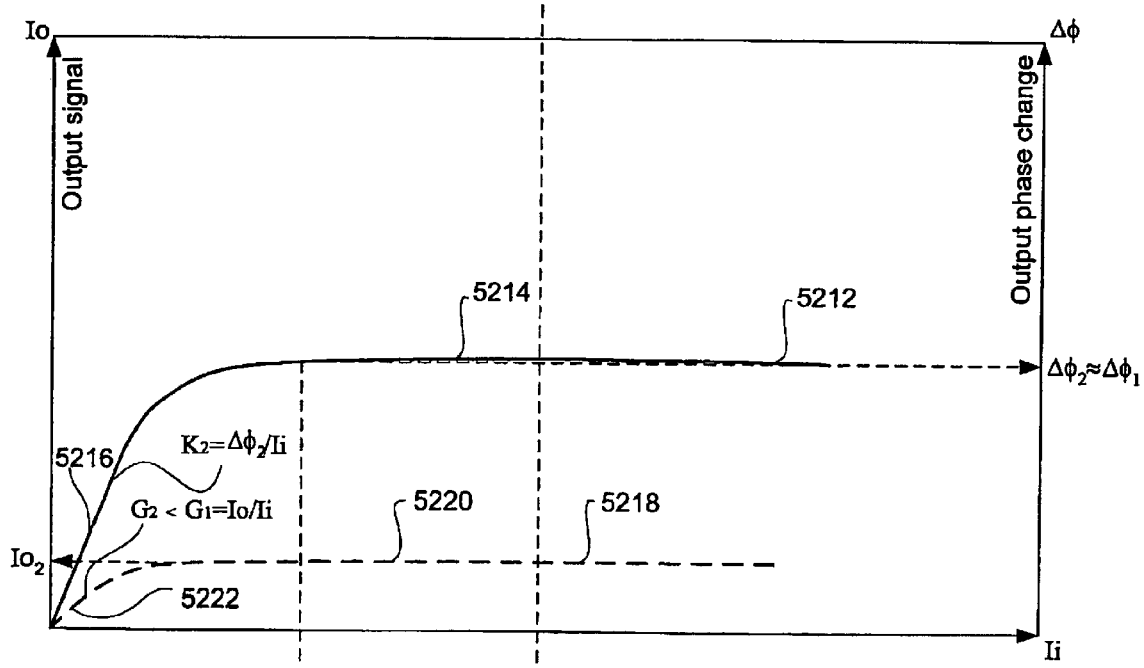

Reference is now made to FIGS. 10*d*, 11*a*, and 11*b*. FIG. 10*d* illustrates threshold device 5043 in accordance with further exemplary embodiments of the present invention. FIGS. 11*a* and 11*b* illustrate the amplitude and phase transmission functions of a NLE (e.g., SOA, LOA, or EDFA) of device 5043 for two, respective, excitations levels. The threshold device 5043 in accordance with the embodiment of FIG. 10*d* may have a structural design generally similar to the structural design of device 5041 of FIG. 10*c*, with the following differences. In the component structure of the device, attenuator 5092 of FIG. 10*c* is removed and attenuator 5094 of FIG. 10*c* is replaced by an amplifier 5098. Additionally, device 5043 may be designed to operate in accordance with two different modes as detailed below.

In the first mode of operation of device 5043, couplers 5045 and 5060 may be symmetric couplers (e.g., m=1, n=1). Amplifiers 5054 and 5098 may be generally identical; however, the excitation level (e.g., optical pumping or current injection level) of amplifier 5098 may be lower than the excitation level of amplifier 5054. Thus amplifier 5098 may have a lower saturation level. The transmission functions and the saturation levels of amplifiers 5098 and 5054 are depicted denoted by symbols 5100 and 5102, respectively. Lower input pulses 5400 and 5037 and high-level pulse 5039 of input signal pattern 5027 may be amplified and attenuated by amplifier 5086 and attenuator 5088, respectively, to produce a variable input gain, if necessary. Lower input pulses 5400 and 5037, which may be split by splitter 5045 into branches 5048 and 5050, may be amplified and their phase may be shifted by amplifiers 5098 and 5054. Phase shifter 5052 may control the phase of pulses within the range of lower level amplitudes such that the pulses enter port 5056 in a phase that ensures a desired destructive interference at port 5062. In this design, lower-level pulses substantially cancel each other out at output port 5062, resulting in a zero-level output signal from coupler 5060.

Higher-level input pulse 5039 may also be split by splitter 5045 into pulses 5039*a* and 5039*b*, propagating along branches 5048 and 5050, respectively. Pulse 5039*b* may be amplified by amplifier 5054 to produce pulse 5039*d*. Pulse 5039*a* may be amplified by amplifier 5098, which may have a saturation level lower than the saturation level of amplifier 5054 and, thus, may already be saturated at the amplitude magnitude of pulse 5039*a*. Accordingly, the amplitude of pulse 5039*c* that is produced by amplifier 5098 is smaller than the amplitude of pulse 5039*d* produced by amplifier 5054. The difference between the amplitudes of pulses 5039*d* and 5039*c* is enough to produce a significantly non-zero output signal at port 5062. In addition, the phase shift of pulse 5039*c*, which may be in the saturated region of amplifier 5098, may be greater than the phase shift of pulse 5039*d*, which may be in the linear region of amplifier 5054. In this scenario, the different shifts of the phases of pulses 5039*c* and 5039*d* further enhance output signal 5087, for higher level input signal, because the interference at port 5062 may not be perfectly destructive. Amplifier 5090 may be used to enhance pulse 5087 and, thereby, to produce a higher amplitude signal 5089.

FIGS. 11*a* and 11*b* illustrate transmission functions of output intensity, Io, and output phase shift, $\Delta\phi$, versus input intensity, Ii, corresponding to amplifiers 5054 and 5098, respectively. Solid line 5200 in FIG. 11*a*, which corresponds to amplifier 5054, illustrates the output phase shift $\Delta\phi$ versus the input intensity Ii with saturated and linear regions, 5202 and 5204, respectively. Broken line 5206 in FIG. 11*a* illustrates the output intensity Io versus the input intensity Ii of amplifier 5054 with saturated and linear regions, 5208 and 5210, respectively. Similarly, solid line 5212 in FIG. 11*b*, which corresponds to amplifier 5098, illustrates the output phase shift $\Delta\phi$ versus the input intensity Ii with saturated and linear regions, 5214 and 5216, respectively. Broken line 5218 of FIG. 11*b* illustrates the output intensity Io versus the input intensity Ii of amplifier 5098 with saturated and linear regions, 5220 and 5222, respectively.

It can be seen that amplifier 5054 with the higher excitation has a gain slope $G_1$ that is steeper than the gain slope $G_2$ of amplifier 5098 with the lower excitation. On the other hand, the slope of the phase shift, $K_1$, in amplifier 5054 is less steep than the slope of the phase shift, $K_2$, in amplifier 5098. This means that even if amplifiers 5054 and 5098 are designed to be identical, the different excitation levels of the two amplifiers result in different gains and different phase shifts for the two amplifiers. Accordingly, device 5043 may operate in a mode that produces an output signal in response to higher-level input signals, when amplifier 5098 is saturated and amplifier 5054 is not saturated, resulting in the two amplifiers having different gains and phase shifts. When device 5043 receives at its input 5044 signals in the range of lower level amplitudes, the resultant signals at branches 5056 and 5058 may cancel each other out at output port 5062. However, since amplifiers 5054 and 5098 have different gain slopes, $G_1$ and $G_2$, respectively, and different phase shift slopes, $K_1$ and $K_2$, respectively, the resultant signals at terminals 5056 and 5058 have different gains and phase shifts, as explained above, even in the range of lower level input signals. Accordingly, while in the lower range amplifiers 5054 and 5098 compensate for each other's results, their mutual compensation may not be accurate and the signals of branches 5056 and 5058 may not completely cancel each other out at port 5062 to produce zero-level (or close to zero-level) signals across the range of lower level input signals.

An improvement to the performance of device 5043, in a second mode of operation, may be achieved by using asymmetric couplers 5045 and 5060 to produce substantially zero-level output signals across the range of lower-level inputs. In the second mode of operation of device 5043 of FIG. 10*d*, asymmetric couplers may be used for couplers 5045 and 5060 instead of the symmetric couplers used in the first mode of operation of the design of device 5043 in FIG. 10*c* above.

Coupler 5045 may receive input signals from terminal 5044 and may split them at a ratio of 1:m, where the larger split portion (m) is directed toward branch 5050, which leads to amplifier 5054 with the less steep phase shift slope $K_1$, and the smaller split portion (1) is directed toward branch 5048, which leads to amplifier 5098 with the steeper phase shift slope $K_2$. The ratio 1:m may be chosen to be similar to the ratio $K_1:K_2$. Thus, the product $1 \cdot K_2 = m \cdot K_1$ may be fulfilled, thereby assuring that substantially the same phase shift would be produced by both of amplifiers 5054 and 5098 across the range of lower level input signals, at least over the amplitude range in which amplifier 5098 is substantially linear.

Since, under the above conditions, amplifiers 5054 and 5098 produce substantially the same phase shift across the range of lower level input signals, phase shifter 5052 may be adjusted to maintain the relative phase shift between the pulses at branches 5056 and 5058 such that the pulses from the two branches may interfere destructively at output port 5062. However, maintaining the same phase shift for both amplifiers 5054 and 5098 requires that the smaller split amplitudes (fraction 1 from coupler 5045) be directed towards amplifier 5098 via branch 5048 with the lower amplitude gain $G_2$. At the same time, the larger split amplitudes (fraction m from coupler 5045) are directed toward amplifier 5054 via branch 5050 with the higher amplitude gain $G_1$. This means that the amplitudes with the smaller fraction (1) at terminal 5056 may be amplified by the smaller gain $G_2$, resulting in significantly smaller amplitudes than the amplitudes at terminal 5058 that are produced from the larger split fraction (m) amplified by the larger gain $G_1$.

To ensure that the amplitudes from terminals 5056 and 5058 are recombined with substantially equal amplitudes at output port 5062, combiner (directional coupler) 5060 may be asymmetric with a combining ratio of 1:n, where the larger n portion arrives at port 5062 via branch 5056 and the smaller 1 portion arrives to that port via branch 5058. In the range of low level input signals, the amplitude at port 5062 should be substantially zero and may be given by:

$$I_{5062} = 1 \cdot G_2 \cdot n - m \cdot G_1 \cdot 1 = 0 \quad (5)$$

which may be reduced to: $G_2 \cdot n = m \cdot G_1$

For higher-level input signals, such as pulse 5039, amplifier 5098 may be saturated, its gain is reduced, and its phase shift is no longer equal to the phase shift of amplifier 5054. This results in a significantly non-zero output signal 5087 at output port 5062 because the interference in port 5062 in this scenario is not completely destructive and the condition that $G_2 \cdot n = m \cdot G_1$, derived from Equation 5, is no longer fulfilled.

From the above discussion, it is clear that the second design (mode) of device 5043, using asymmetric couplers 5045 and 5060, may be advantageous over the design using symmetric couplers because asymmetric design is clearly capable of maintaining the output signal 5087 at port 5062 at an amplitude of substantially zero across the entire range of lower level input signals.

In devices 5040, 5041, and 5043 of FIGS. 10a–10d, the "turn on" point in both the symmetric coupler design and the asymmetric coupler design, may be adjusted by adjusting the saturation level of amplifiers 5098 and 5045, e.g., by optical pumping or current injection. The excitation levels of amplifiers 5089 and 5045 may be different. Additional adjustable parameters that may determine the "turn on" point include gain G and the length L of amplifiers 5054 and 5098, the splitting ratios m and n of couplers 5045 and 5060, and the attenuation level of attenuators 5088, 5094 and 5092, which attenuation level may be different for each attenuator.

The "turn on" point of devices 5040, 5041 and 5043 may actually be a threshold level. For low-level input signals, e.g., in the range below the "turn on" threshold, the output signal may be strongly attenuated by destructive interference at the output ports of the devices. This may result in a transmission function between the input and the output of the devices including a generally monotonic range with a relatively shallow slope. For high-level input signals, e.g., in a range above the "turn on" threshold, the output signal at the output port of the devices may increase sharply, whereby the transmission function between the input and the output of these devices may include a range with a steep slope.

In some embodiments of the invention, the amplitude at branch 5050 may be attenuated by a factor of 1/n prior to entering branch 5058. In such embodiments, a symmetric (i.e., 1:1) coupler may be used instead of asymmetric (1:n) coupler 5060. Similarly, in some embodiments of the invention, asymmetric coupler 5045 (1:m) may be replaced by a symmetric coupler with additional attenuators, in analogy to the configuration of device 5041 in FIG. 10c where symmetric coupler 5045 is used in conjunction with attenuators 5092 and 5094.

In analogy to device 5040 of FIG. 10a, the devices 5040, 5041, and 5043 of FIGS. 10b, 10c, and 10d, respectively, may include a continuous sequence of optical components connected by light guiding media such as, for example, optical fibers, planar waveguides, or planar circuits (PLC), which may be fabricated using integrated optic techniques and/or on-chip manufacturing. Alternatively, devices 5040, 5041, and 5043 may be constructed from discrete components, in which case the optical fibers may be replaced by open space or a non-solid medium, e.g., a gas medium, and the directional couplers may be replaced by any suitable alternative components, e.g., beam splitters. It should be understood that, in embodiments of the invention, some or all of the couplers, amplifiers and/or attenuators used may include variable and/or adjusted components.

Figure 12A:
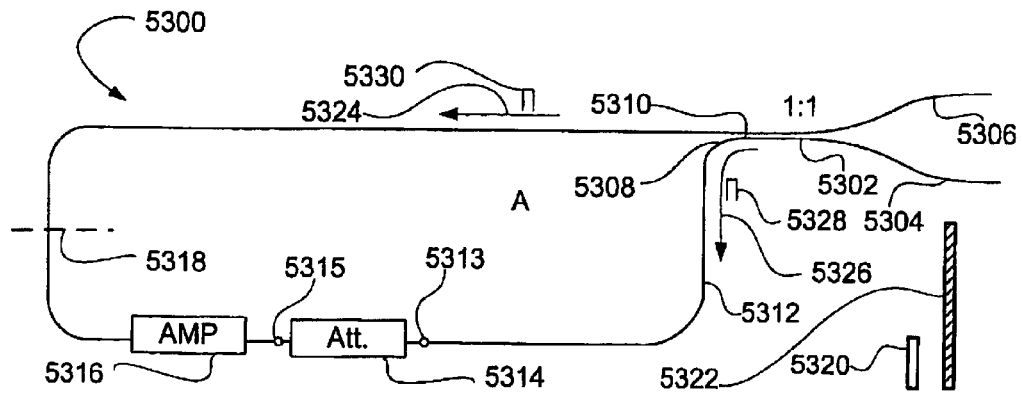
FIG. 12a is a schematic illustration of a threshold device according to exemplary embodiments of another aspect of the present invention, including a nonlinear optical loop structure.
Figure 12B:
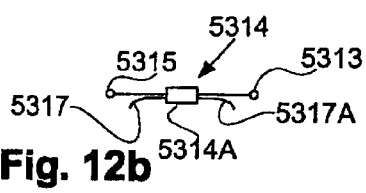

Reference is made to FIG. 12a, which schematically illustrates an optical threshold device, denoted 5300, in accordance with exemplary embodiments of another aspect of the present invention. Reference is also made to FIG. 12b, which schematically illustrates an attenuator 5314 that may be used in conjunction with exemplary embodiments of the device of FIG. 12a. The design of device 5300 may be beneficial because it is generally insensitive to the phase of the light signals and thus does not require a phase shifter or phase control. Device 5300 includes a symmetric directional coupler 5302 having an input terminal 5304 and an output terminal 5306. Additional two terminals 5308 and 5310 of coupler 5302 may be connected to each other via a loop 5312 in a configuration similar to a loop mirror, as described below. Loop 5312 may include an amplifier 5316 and attenuator 5314. Amplifier 5316 may include any suitable type of amplifier, for example, a SOA, LOA, or EDFA. Attenuator 5314, which may be connected between connection points 5313 and 5315 on loop 5312, may include any suitable type of attenuator, for example, a Variable Optical Attenuator (VOA). It should be appreciated that the attenuators and/or VOA's used in conjunction with embodiments of the present invention may be implemented in the form of any type of device that causes attenuation of signals, including devices not conventionally used for attenuation purposes. For example, in some embodiments, an attenuation function may be implemented by an optical amplifier, e.g., a SOA, a LOA, or an EDFA, excited to levels at which the amplifier absorbs rather than amplifies input signals. In some exemplary embodiments, attenuator 5314 may include a fixed or variable coupler 5314A, connected between connection points 5313 and 5315, as illustrated schematically in FIG. 12b. The attenuation factor of attenuator 5314 may be adjustable and may depend on the fraction of energy that coupler 5314A may transmit between points 5313 and 5315 as well as the fraction of energy that coupler 5314 may couple out via a set of terminals, denoted 5317 and 5317A. When an input pulse, such as pulse 5320, is received at input 5304 of device 5300, the input pulse may be split by symmetric coupler 5302, e.g., at a splitting ratio of 1:1, into ports 5308 and 5310, respectively. A split pulse 5330 transmitted by port 5310 may propagate counterclockwise (i.e., in the direction of arrow 5324) and its phase may be shifted, by coupler 5302, π/2 radians (i.e., crossbar transmission or crossover transmission). The split pulse 5328 transmitted by port 5308 may propagate clockwise (i.e., in the direction of arrow 5326) and its phase may be not be shifted by coupler 5302 (i.e., bar transmission).

It should be noted that if loop 5312 does not include a NLE component, such as amplifier 5316, the pulses 5330 and 5328 that propagate counterclockwise and clockwise, respectively, complete their travel around loop 5312 and return to ports 5308 and 5310, respectively, with equal amplitudes and the same relative phases. The relative phase is maintained because both pulses 5328 and 5330, which propagate in mutually opposite directions, travel exactly the same distance, i.e., the length of loop 5312. The amplitudes of pulses 5328 and 5330 returning to ports 5310 and 5308, respectively, are equal to each other because they travel through the exact same medium, which is symmetric and linear for both propagation directions. This means that pulse 5330 that returns to port 5308 is π/2 radian ahead with respect to pulse 5328 that returns to port 5310. On their return paths, each of pulses 5328 and 5330, upon arrival at ports 5310 and 5308, respectively, may be re-split into ports 5306 and 5304, e.g., at a 1:1 ratio for each split, wherein the crossover split produces a phase shift of π/2 radians and the bar split does not produce any phase shift. Accordingly, the crossbar split of pulse 5330 from port 5308 may destructively interfere with the bar split of pulse 5328 from port 5310, thereby to produce substantially zero output at output port 5306. At the same time, the crossbar split of pulse 5328 from port 5310 may constructively interfere with the bar split of pulse 5330 from port 5308, thereby to produce a reflected signal that carries substantially the entire energy of pulse 5320 reflected back to input port 5304. Normalizing the input energy of pulse 5320 to a value of 1, the energy at output port 5306, when loop 5312 does not includes NLE 5316, may be given by:

$$I_{5306} = A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \quad (6)$$

Where j indicates a phase shift of π/2 radians, and A is the intensity attenuation factor of attenuator 5314.
The energy reflected back to input port 5304 may be given by:

$$I_{5304} = A \cdot \left[ \frac{1}{\sqrt{2}} \cdot \frac{j}{\sqrt{2}} + \frac{j}{\sqrt{2}} \cdot \frac{1}{\sqrt{2}} \right]^2 = A \quad (7)$$

Figure 13:
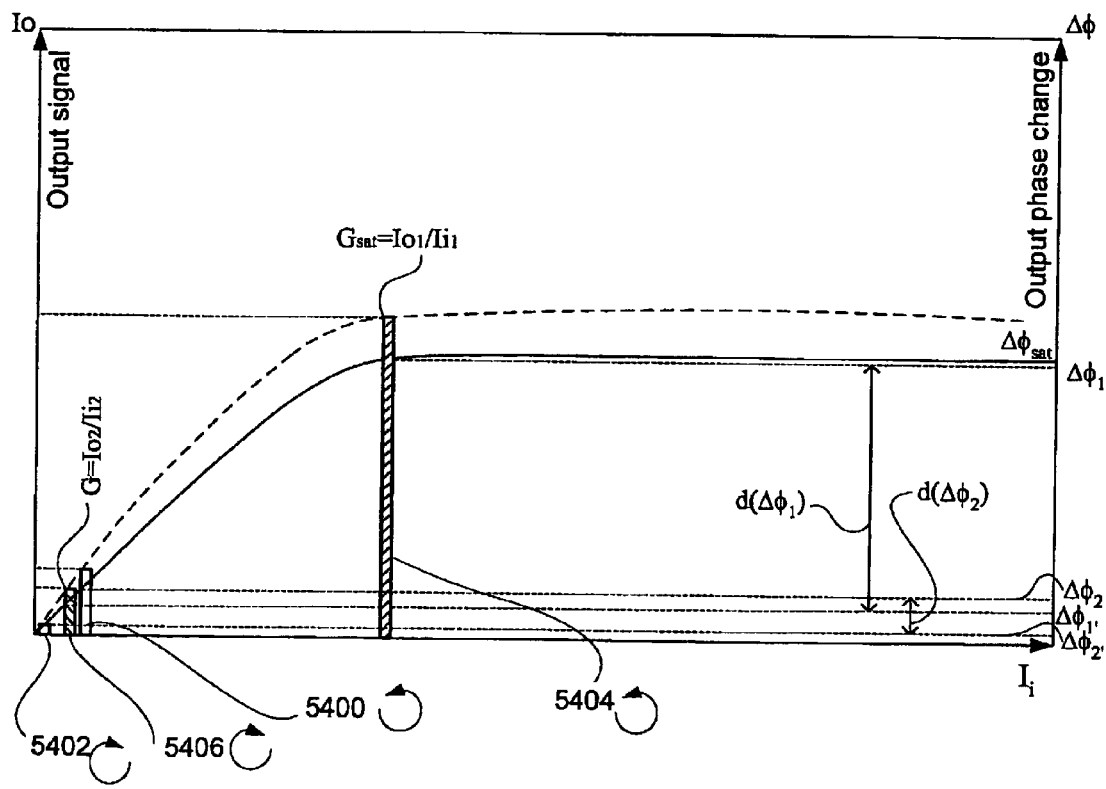
FIG. 13 is a schematic illustration of a graph depicting relative phase shift and intensity of output signals produced by a NLE according to exemplary embodiments of the invention in response to input signals of two different amplitudes, showing two pulses propagating in opposite directions for each amplitude.

FIG. 13 schematically illustrates a graph showing the relative phase shift and intensity of the output signals of a NLE, for example, amplifier 5316 of FIG. 12a, versus the input signals for two different amplitudes of pulses that propagate in opposite directions. FIG. 13 is useful in analyzing the operation of device 5300 in FIG. 12a where loop 5312 includes amplifier 5316. In analogy to the graph in FIG. 9a, the graph of FIG. 13 shows the transmission function of the output intensity Io and the output phase shift Δϕ of NLE amplifier 5316 versus the input intensity Ii. When lower level input pulse 5320 having a normalized field amplitude value of 1 is received by input 5304 of device 5300 in FIG. 12a, the field amplitude of split pulse 5330, denoted 5400 in FIG. 13, propagating in the counterclockwise direction indicated by arrow 5324 in FIG. 12a, is 1/√2 at the entrance of amplifier 5316. Further, in this scenario, the field amplitude of split pulse 5328, denoted 5402 in FIG. 13, propagating in the clockwise direction indicated by arrow 5326 in FIG. 12a, is √A/√2 at the entrance to amplifier 5316. Factor A represents the level of power intensity attenuation resulting from attenuator 5314. Since both pulses, i.e., pulses 5400 and 5402, may be within the linear range of amplifier 5316, the two pulses may be amplified by amplifier 5316 by the same intensity gain factor $G_{linear}$. The two pulses are also attenuated by the same factor A at attenuator 5314. Accordingly, both pulses return to ports 5308 and 5310 after undergoing substantially the same attenuation, A, and the same amplification, $G_{linear}$. Thus, the amplitudes of the two pulses, after amplification and attenuation, may be substantially equal to each other.

As described above, pulses 5400 and 5402 enter amplifier 5316 of FIG. 12a with different field amplitudes, e.g., 1/√2 and √A/√2, respectively. Accordingly, amplifier 5316 may shift the phases of pulses 5400 and 5402 by different amounts. However, since pulses 5400 and 5402 are low amplitude pulses, their phases may be shifted only by small shifts, Δϕ₂ and Δϕ₂', respectively, yielding an even smaller additional relative phase shift, d(Δϕ₂)=Δϕ₂−Δϕ₂', between the pulses. The influence of such additional relative phase shift is generally insignificant for the purposes of the invention. Accordingly, the additional relative phase shift produced by amplifier 5316 between pulses 5400 and 5402 is negligible and pulses 5400 and 5402 may return to ports 5308 and 5310 with amplitudes that are substantially equal to each other and with a relative phase shift substantially equal to their original relative phase shift, i.e., similar to the relative phase shift originally produced by coupler 5302, e.g., a phase shift of about π/2 radians.

Because the amplitudes of the pulses returning to ports 5308 and 5310 are substantially equal to each other, and due to the small influence of amplifier 5316 on the relative phases of pulses 5400 and 5402 for low level input signals, the behavior of device 5300 in this case may be generally similar to that of an analogous device (not shown) without amplifier 5316 in loop 5312. Accordingly, in the case of low level input signals, substantially all the energy of pulse 5320, after amplification by gain $G_{linear}$ and attenuation A, may be reflected back to input 5304. Based on the above, the intensity $I_{5306}$ at output port 5306 and the intensity $I_{5304}$ reflected back to port 5304 may be given by the following equations:

$$I_{5306} = G_{linear} \cdot A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \quad (8)$$

$$I_{5304} = G_{linear} \cdot A \cdot \left[ \frac{1}{\sqrt{2}} \cdot \frac{j}{\sqrt{2}} + \frac{j}{\sqrt{2}} \cdot \frac{1}{\sqrt{2}} \right]^2 = G_{linear} \cdot A$$

where $G_{linear}$ represents the intensity amplification gain within the linear range.

The desired situation in which substantially all the energy of the low level input pulse may be reflected back into the input and there is substantially no signal at the output may be achieved by using symmetric couplers, such as coupler 5302. In contrast, devices such as the device described in the '979 patent mentioned above, are based on using an asymmetric coupler in the entrance to a loop mirror, wherein the asymmetric coupler is an essential element of the device. It should be appreciated that the above described feature of the present invention, whereby substantially all the energy of the low level input pulse is reflected back to the input, leaving substantially no signal at the output, cannot be achieved in devices based on using asymmetric coupler at the entrance to the loop mirror, such as that disclosed in the '979 patent.

For higher-level input pulses, for example, pulse 5322 in FIG. 12a, having field amplitude H, the counterclockwise split pulse 5404 may enter amplifier 5316 with a field amplitude H/√2, which falls within the saturation range of amplifier 5316. The clockwise split pulse 5406 may enter amplifier 5316 with a field amplitude √A·H/√2, which falls within the linear range of amplifier 5316. Counterclockwise split pulse 5404 is amplified by amplifier 5316 by intensity gain factor $G_{sat}$, which is smaller than $G_{linear}$ due to the reduced gain in the saturation region, and the phase of pulse 5404 is shifted by the same amplifier 5316 by $\Delta\phi_1=\Delta\phi_{sat}$. Clockwise split pulse 5406 is amplified by amplifier 5316 by gain factor $G_{linear}$, in the linear region, and the phase of pulse 5406 is shifted by the same amplifier 5316 by $\Delta\phi_1$. Although the ratio between low amplitude pulses 5400 and 5402 may be similar to the ratio between higher amplitude pulses 5404 and 5406, namely, a ratio equal to one divided by the field amplitude attenuation factor √A, the difference between the amplitudes of pulses 5404 and 5406 may be much larger than the difference between the amplitudes of pulses 5400 and 5402. Accordingly, the relative phase shift between high level pulses 5404 and 5406, denoted $d(\Delta\phi_1)=(\Delta\phi_{sat}-\Delta\phi_1)$, may be much larger than the relative phase shift between low level pulses 5400 and 5402, denoted $d(\Delta\phi_2)$. This means that pulses 5404 and 5406 return to ports 5308 and 5310 with different field amplitudes $\sqrt{G_{sat}}\cdot\sqrt{A}\cdot H/\sqrt{2}$, $\sqrt{G_{linear}}\cdot\sqrt{A}\cdot H/\sqrt{2}$, respectively, and significant different phase shifts, $\Delta\phi_{sat}$ and $\Delta\phi_1$, respectively.

Thus, for such high level inputs, when choosing the proper length of amplifier 5316, $d(\Delta\phi_1)$ may be adjusted to be equal to π radians while still maintaining a negligible value, $d(\Delta\phi_2)$, of the relative phase shift for low-level input amplitudes. When $d(\Delta\phi_1)$ is equal to π radians, a relatively large fraction of the energy of the higher-level input pulse 5322 may be emitted out by device 5300 through its output 5306 and only a small fraction may be reflected back through input 5304. In this case, the output intensity $I_{5306}$ and the intensity $I_{5304}$ reflected back into input 5304 may be given by:

$$I_{5306} = H^2 \cdot A \cdot \left[ \frac{\sqrt{G_{linear}}}{\sqrt{2}} \cdot \frac{1}{\sqrt{2}} + \frac{\sqrt{G_{sat}}}{\sqrt{2}} \cdot \frac{1}{\sqrt{2}} \right]^2 \neq 0 \quad (9)$$

$$I_{5304} = H^2 \cdot A \cdot \left[ \frac{\sqrt{G_{linear}}}{\sqrt{2}} \cdot \frac{j}{\sqrt{2}} - \frac{j}{\sqrt{2}} \cdot \frac{\sqrt{G_{sat}}}{\sqrt{2}} \right]^2$$

In the above discussion, device 5300 is analyzed for the case where the reduced amplitude pulse 5406 is in the linear region of amplifier 5316 and the unreduced amplitude pulse 5404 is in the saturated region of that amplifier. It should be noted that there are at least two additional settings relevant to describing effective operation of device 5300. In a first additional setting, pulses 5406 and 5404 have the same gain $G_{linear}$; however, the phase sifts produced for the two pulses by amplifier 5316 are different. In a second additional setting, amplifier 5316 shifts the phases of pulses 5406 and 5404 by the same amount $\Delta\phi_1=\Delta\phi_{sat}$; however, the gains produced for the two pulses by amplifier 5316 are different.

It should be appreciated that the analysis of device 5300 for the two additional settings of device 5300, in the case of low level input signals, may be generally the same as discussed above with reference to the case where no output signal is produced. Therefore, the two additional settings of device 5300 are not further analyzed herein in the context of low-level input signals.

Analyzing device 5300 in the range of high input signals, according to the first additional setting, it is noted that pulses 5406 and 5404 are both in the linear region of amplifier 5316. In this case, when amplifier 5316 is sufficiently long, when the length of the amplifier is appropriately adjusted and when attenuation factor A is adjusted to produce the proper ratio between pulses 5404 and 5406, the relative phase shift $d(\Delta\phi_1)$ may be adjusted to be equal to π radians even when the amplitude of pulse 5404 is still in the linear range. Accordingly, pulses 5404 and 5406 are amplified by the same factor $G_{linear}$. Therefore, $G_{sat}$ may be replaced by $G_{linear}$ in the above equations 9, taking into account phase inversion. In this first additional setting, for high-level input signals, the entire energy may be emitted from output port 5306 and substantially no energy may be reflected back through input 5304.

According to the second additional setting, analyzed for the case of high level input signals, the amplitude of pulse 5406 may be sufficiently high to be included in the saturated range of amplifier 5316 and, thus, amplifier 5316 may not produce any relative phase shift $d(\Delta\phi_1)$ between pulse 5406 and pulse 5404, because both pulses are in the saturated region of amplifier 5316. However, since pulse 5404 may be at a much deeper saturation level than pulse 5406, pulse 5404 may have a gain, $G_{sat1}$, that is much lower than the gain, $G_{sat2}$, of pulse 5406. In this case, the transmitted intensity $I_{5306}$ and the reflected intensity $I_{5304}$ may be given by:

$$I_{5306} = H^2 \cdot A \cdot \left[ \frac{\sqrt{G_{lsat2}}}{\sqrt{2}} \cdot \frac{1}{\sqrt{2}} + \frac{\sqrt{G_{sat1}}}{\sqrt{2}} \cdot \frac{1}{\sqrt{2}} \right]^2 \neq 0 \quad (10)$$

$$I_{5304} = H^2 \cdot A \cdot \left[ \frac{\sqrt{G_{lisat2}}}{\sqrt{2}} \cdot \frac{j}{\sqrt{2}} + \frac{j}{\sqrt{2}} \cdot \frac{\sqrt{G_{sat1}}}{\sqrt{2}} \right]^2$$

Accordingly, device 5300 may operate as a threshold device that produces substantially no output signal for lower level input signals, while emitting a large fraction of the energy of higher level input signals through its output 5306. It is clear that, for all the versions of device 5300 described above, the larger the ratio between pulses 5404 and 5406, the larger the relative phase shift $d(\Delta\phi_1)$ between the pulses and the larger the different between $G_{linear}$ and $G_{sat}$, resulting in improved operation of device 5306 for the higher level input signals. It should be appreciated that, in device 5300 according to exemplary embodiments of the present invention, there may be virtually no limitation on the ratio between pulses 5404 and 5406, and the ratio may be as desired, for example, equal to one over the attenuation factor of attenuator 5314. Further, in view of the above analysis, it should be appreciated that although the use of a large attenuation factor, i.e., a small value for A, may improve the performance of device 5300 in the range of higher level input signals, such large attenuation does not degrade the performance of device 5300 in the range of lower level input signals.

It is noted that a high ratio between pulses is also desired for devices such as that described in the '979 patent mentioned above; however, in contrast to the present invention, the allegedly high ratio achieved by the device described in the '979 patent results from the asymmetry of the input coupler of the device. To produce the desired ratio according to the device described in the '979 patent, the level of asymmetry of the asymmetric coupler must be very significant, preventing the device from blocking lower level input signals, thereby limiting and/or compromising the performance of such a device.

It is appreciated that, in contrast to prior art devices, such as the device described in the '979 patent, where performance must be compromised, at least, for either the low-level input signals or the high-level input signals, there is no such compromise in device 5300 according to the present invention.

Referring again to FIG. 12a, a virtual mid point 5318 divides loop 5312 into two halves, wherein each half has an equal length, S, representing the distance from port 5310 to mid point 5318 or from port 5308 to mid point 5318. It is noted that the counterclockwise pulse 5330 and the clockwise pulse 5328 inherently meet and overlap each other at mid point 5318. When streams of pulses that are separated from each other by time periods, T, enter loop 5312 of device 5300, and split into clockwise and counterclockwise streams, a pulse in the counterclockwise stream, such as pulse 5330, meets a pulse in the clockwise stream, such as pulse 5328, every half time period, T/2. This means that after every distance X=T/2·C/n, wherein C is the speed of light in vacuum and n is the refractive index of the optical guides, there is a meeting ("collision") point between pulses that propagate in loop 5312 in opposite directions. To avoid such collisions from occurring at the NLE, e.g., at amplifier 5316, the location of the NLE should be off center by a distance δS that may be given by:

$$l \cdot X < \delta S < m \cdot X \quad (11)$$

where X is the above given distance between two adjacent meeting (collision) points and l and m are consecutive integers. For the specific example of l=0 and m=1, Equation 11 may be reduced to: δS<X.

When a low amplitude pulse, such as pulse 5406, enters amplifier 5316 first, the pulse does not deplete an inverse population of the amplifier and, thus, a higher amplitude pulse 5404 may enter the NLE immediately following the exit of pulse 5406. In a situation when the order of the locations of amplifier 5316 and attenuator 5314 is reversed, the higher amplitude pulse may enter NLE 5316 first. In this reverse order case, the higher amplitude pulse may deplete the inverse population of amplifier 5316 and, thus, a recovery time Δτ may be needed for amplifier 5316 to build an inverse population before entry of a lower amplitude pulse. Therefore, in the latter case, or in a situation where the stream of input pulses includes only high amplitude pulses, T/2 may be longer than Δτ.

As discussed above, the efficiency of device 5300 may be improved by increasing the ratio between the higher and the lower levels included in the input signal. Further, the output signals produced by device 5300 that correspond to different levels of input pulses have a more distinctive amplitude ratio than the ratio between their respective input pulses. Accordingly, an improved threshold system in accordance with exemplary embodiments of the present invention may include a configuration of a more than one device 5300, for example, at least two devices 5300 connected in series, wherein the output signals from one device 5300 may be fed directly into the input of a subsequent device 5300. Such a configuration may be used to improve threshold capability by further accentuating the distinction between lower and higher amplitude pulses.

Figure 14:
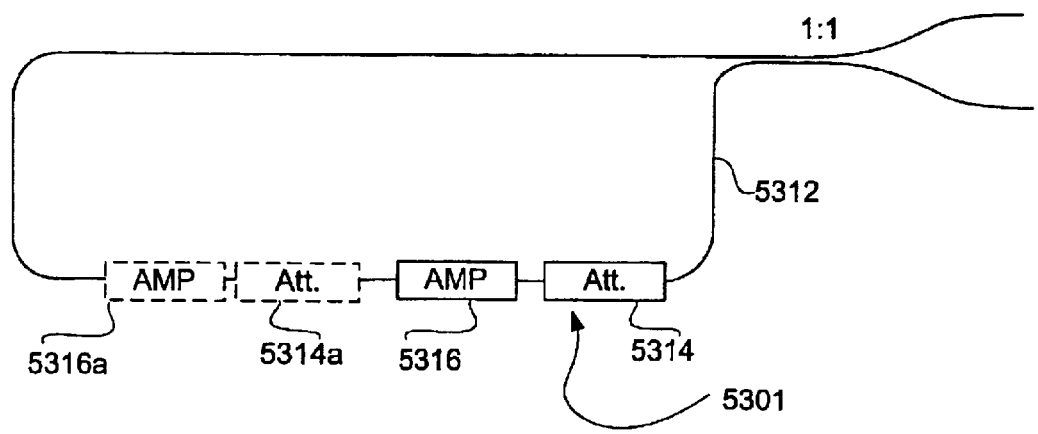
FIG. 14 is a schematic illustration of an alternative design for a threshold device including a nonlinear optical loop according to exemplary embodiments of the present invention.

Referring to FIG. 14, a threshold device 5301 in accordance with further exemplary embodiments of the invention is shown. The design of device 5301 is a modified version of the design of device 5300. In addition to the NLE-attenuator functionality, which may be performed by amplifier 5316 and attenuator 5314, as described above with reference to device 5300, device 5301 includes additional NLE-attenuator functionality, which may be embodied in the form of an amplifier 5316a and an attenuator 5314a. As discussed above with reference to optimizing the operation of device 5300, the length of amplifier 5316 may be adjusted to produce a relative phase shift d(Δφ$_1$) equal to π radians. However, since the required adjusted length for amplifier 5316 in device 5300 may not be commercially available and may be difficult to produce, the additional set of amplifier 5316a and attenuator 5314a may be added to enable such adjustment. In this case the required length of each amplifier (5316 or 5316a) of device 5301 may be about half of the required length required for the single amplifier 5316 in device 5300. In some alternative embodiments, similar relative phase shifting may be achieved by adding only amplifier 5316a, i.e., without using attenuator 5314a; however, the addition of attenuator 5314a may useful to enable a further increase of the amplitude ratio between the counterclockwise and the clockwise signals propagating in loop 5312.

Figure 15:
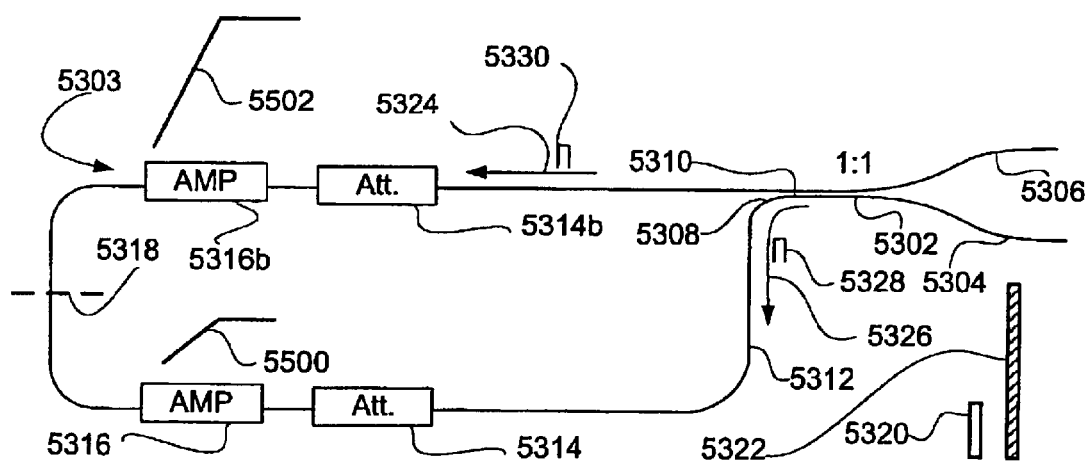
FIG. 15 is a schematic illustration of another alternative design for a threshold device including a non-linear loop structure according to exemplary embodiments of the present invention.

FIG. 15 schematically illustrates a device 5303, which is a variation of the design of device 5300 of FIG. 12a. Device 5303 may enable expansion of the range of lower level input signal for which the very high performance and output signals very close to zero may be obtained. As shown in FIG. 15, device 5303 has generally the same structure as device 5300, with the addition of an amplifier 5316b and an attenuator 5314b. Except for amplifier 5316b and attenuator 5314b, identical reference numerals are used in FIGS. 12a and 15 to indicate components with identical or similar structure and functionality. The parameters of attenuator 5314b and amplifier 5316b may be generally identical to those of attenuator 5314 and amplifier 5316, respectively; however, amplifier 5316b may be excited to a higher excitation level than amplifier 5316. Transmission functions of amplifiers 5316b and 5316 are roughly illustrated by symbols 5502 and 5500, respectively, in FIG. 15.

For lower level input signals, such as pulse 5320, amplifiers 5316b and 5316 both operate at their linear region in a similar way and, thus, loop 5312 may be quasi-symmetric and the entire energy of the input signal may be reflected back into input 5304. However, the range of the low level input signals for which the output signals are very close to zero is expanded in device 5303 relative to device 5300. This range expansion is possible because the quasi-symmetric configuration of loop 5312 is maintained in device 5303 for a wider range of input amplitudes due to a phase shift compensation produced by amplifier 5316b to compensate for the small phase shift that amplifier 5316 may produce, as described in detail above. Since amplifiers 5316 and 5316b are excited to different levels of excitations, their gain and phase shifts may not be identical and, therefore, it is appreciated that the phase shift compensation of amplifier 5316b applied to the phase shift of amplifier 5316 may not be perfect. However, since the phase shifts produced by amplifiers 5316 and 5316b in the range of low level input signals is generally small, the difference between these phase shifts (after the compensation) is smaller yet and has no significant influence on the operation of device 5303 over a wider range of lower level input signals.

For higher-level input signals, such as pulse 5322, the additional amplifier 5316b is still within the range of small phase shifts in the linear region and may operate quasi-symmetrically for both counterclockwise and clockwise pulses, such as pulses 5330 and 5328. Thus the set of amplifier 5316b and attenuator 5314b maintains their quasi-symmetry even for the higher-level input signals. However, amplifier 5316 having a saturation level that is lower than the saturation level of amplifier 5316b is driven into a saturation state by the counterclockwise pulses 5330 it receives, yet the amplifier is not driven into saturation by the clockwise pulses 5328 it receives. Accordingly, in this situation, the set of amplifier 5316 and attenuator 5314 "breaks" the symmetry of loop 5312 in a way similar to that explained above with reference to device 5300 of FIG. 12*a*. At the same time, the set of amplifier 5316*b* and attenuator 5314*b* has little influence on the symmetry of loop 5312. Accordingly, in this situation, for higher-level input signal, only amplifier 5316 and attenuator 5314 have a significant role in the production of output signals, whereby device 5303 operates in this range in a manner similar to the operation of device 5300 as discussed above with reference to FIG. 12*a*.

In accordance with embodiments of the invention, each of devices 5301 and 5303 may have a "turn on" point, which may function as a threshold level. For low-level input signals in the range, e.g., below the "turn on" threshold level, output signals are strongly attenuated by destructive interference at the output port of the devices and the transmission function between the input and the output of these devices includes a monotonic range with a shallow slope. For high-level input signals, e.g., in a range above the "turn on" threshold level, the output signal at the output port of the devices increases sharply and the transmission function between the input and the output of these devices may include a range having a steep monotonic slope.

Adjustable parameters that may be used to adjust the "turn on" threshold may include but are not limited to the gain G and the length L of amplifiers 5316, 5316*a* and 5316*b*, and the attenuations of attenuators 5314, 5314*a* and 5314*b*. The excitation levels, the gains, and the attenuations of the different amplifiers and attenuators may be different for each amplifier and/or attenuator.

Devices 5300, 5301 and 5303 of FIGS. 12*a*, 14, and 15, respectively, may include a continuous sequence of optical components connected by light guiding media such as, for example, optical fibers, planar waveguides, or planar circuits (PLC), which media may be fabricated using integrated optic techniques and/or on-chip manufacturing. Alternatively, devices 5300, 5301 and 5303 may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators include variable and/or adjustable components.

All Optical Logic Gates

AND Gate

Figure 16A:
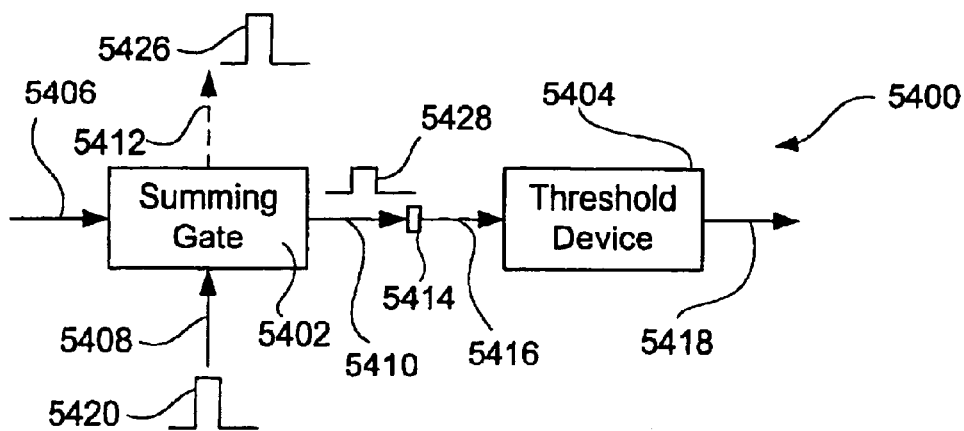
FIGS. 16a–16c are block diagrams illustrating an AND logic gate that produces logic states at is output according to the logic states received in its inputs.
Figure 16B:
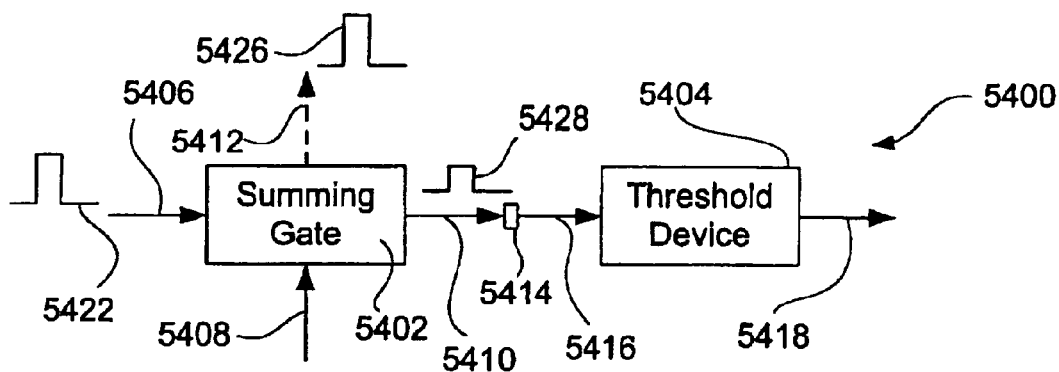
Figure 16C:
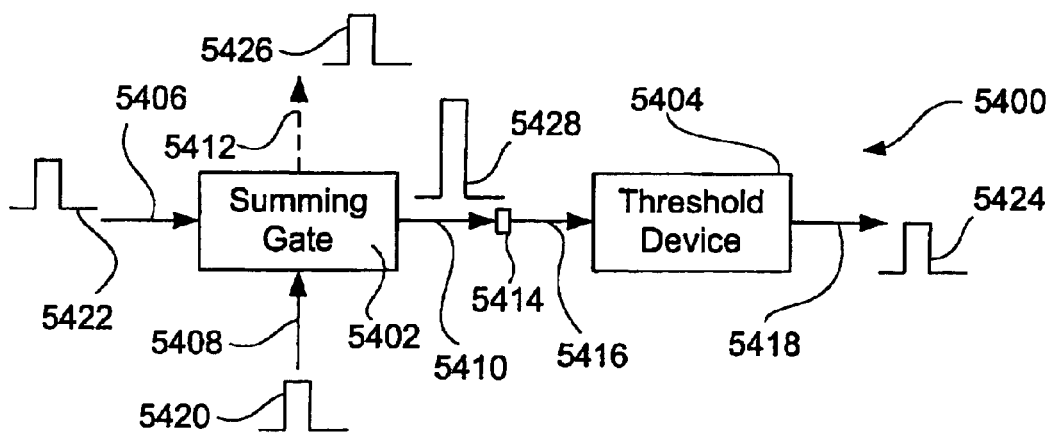

Referring to FIGS. 16*a*–16*c*, illustrating a block diagram of all optical logic AND gate 5400 according to the present invention. Logical AND gate 5400 includes summing gate 5402 and threshold device 5404 connected in series by connector 5414. Summing gate 5402 has inputs 5406 and 5408 and at least two outputs 5410 and 5412. Output 5412 is a non-coincidence output and output 5410 is the coincidence output. Output 5410 of summing gate 5402 is connected, by connector 5414, to input 5416 of threshold device 5404 having output 5418.

FIG. 16*a* illustrates AND gate 5400 in a situation when only input 5408 receives an input signal (input:logic state "1") and input 5406 does not receives any signal (input logic state "0"). Input signal 5420 received in input 5408 is emitted out by summing gate 5402, through coincidence output 5410 and non-coincidence output 5412, as signals 5428 and 5426, respectively. Signal 5428 is fed, through connector 5414, to input 5416 of threshold device 5404. In this case and in spite of the fact that signal 5428 is emitted by coincidence output 5410, it is not a coincidence signal and its amplitude is below the threshold level of device 5404. Accordingly, no output signal (logic state "0") is produced at output 5418 which is the output of both, device 5404 and logic AND gate 5400.

FIG. 16*b* illustrates the same AND gate 5400 in a situation when only input 5406 receives input signal (logic state "1") and input 5408 does not receives any signal (logic state "0"). Input signal 5422 received in input 5406 is emitted out by summing gate 5402, through coincidence output 5410 and non-coincidence output 5412, as signals 5428 and 5426, respectively. In this case and similar to the situation illustrated by FIG. 16*a*, signal 5428 is below the threshold level of device 5404 and no signal (logic state "0") is produced at output 5418 of AND Gate 5400.

FIG. 16*c* illustrates the same AND gate 5400 in a situation when both inputs 5406 and 5408 receive input signals (logic state "1"). Input signals 5422 and 5420 received in inputs 5406 and 5408 are summed and emitted out, by summing gate 5402. In a coherent summing, only signal 5428 is emitted out and through coincidence output 5410. In this case no signal is emitted through non-coincidence output 5412 and all the energy of both of input signals 5420 and 5422, is emitted through coincidence output 5410. In a non-coherent summing, the non coincident output 5412 emits signal 5426 as well and the coincidence output 5410 emits a signal 5428. In both cases, the coherent and the non-coherent summing, signal 5428 has an amplitude that is above the threshold level of device 5404 and thus gate 5400 produces output signal 5424 (logic state "1").

It is obvious that when there is no input signal (logic state "0") at inputs 5408 or 5406 (or both) of gate 5400, there would not be any signal (logic state "0") at its output 5418. When identifying signal 5420 as A and signal 5422 as B, gate 5400 produces, at its output 5418, the AND logic function equals to A·B. Output 5418 may provide an indication when a coincidence situation exists at inputs 5406 and 5408 of gate 5400.

Figure 17:
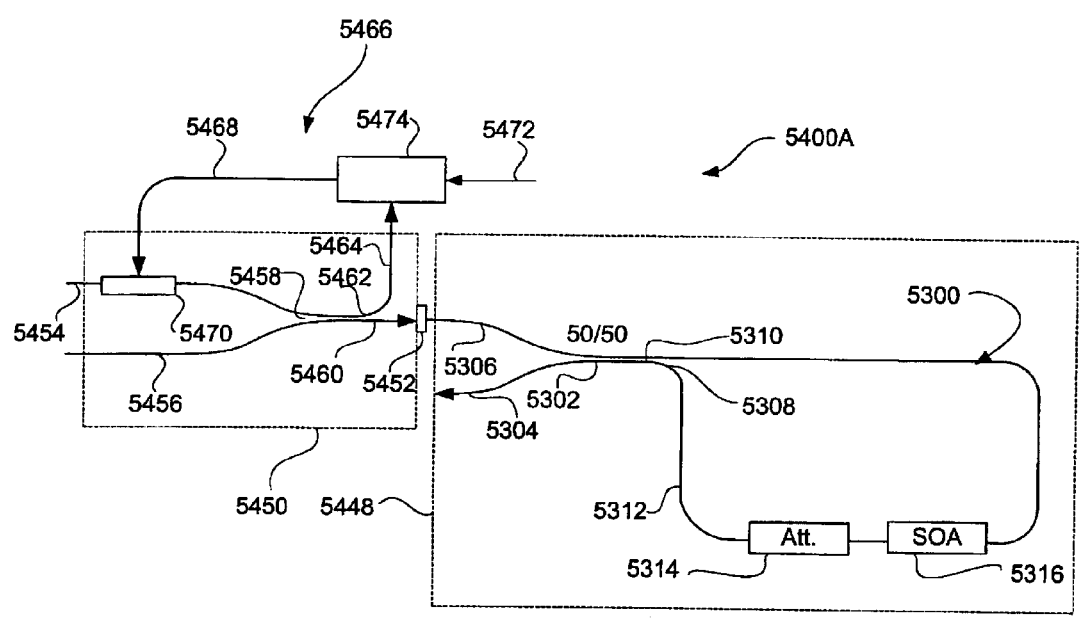
FIG. 17 is a block diagram illustrating an AND logic gate according to the present invention.

Summing gate 5402 may represent every one of the summing gates 100 discussed above and threshold device 5404 may represents every one of the threshold devices discussed above. Accordingly, gate 5400 may represent every one of the combinations between each of the summing gates and each of the threshold devices discussed above. One out of the many possible combinations is illustrated by FIG. 17, as explained below.

IX. Enhancement of the Ratio Between the Coincidence and the Non-coincidence Signal The coincidence and the non-coincidence signals fed from summing gate 5402 to threshold device 5404, as shown in FIGS. 16*a*–16*c*, is actually a two level signal. Threshold device 5404 should discriminate between the two levels by blocking the low level (non-coincidence) signal and transmitting the high level (coincidence) signal. The amplitude of the low level non-coincidence signal can be adjusted into the region in which threshold device 5404 has the best blocking performances for signals under its threshold. Still the amplitude of the high level coincidence signal should be high as desired since the transmission function of threshold device 5404 is improved with the amplitude and so is the Signal to Noise Ratio (SNR). Thus a high ratio between the coincidence pulse and the non-coincidence pulse at the output of summing gate 5402 of FIGS. 16*a*–16*c* is desired.

Referring now to FIGS. 16*a*–16*d*. FIG. 16*d* schematically illustrates a way of how to enhance the ratio between the coincidence pulse and the non-coincidences pulse at the output of summing gate 5402 of FIGS. 16*a*–16*c* when a coherent summing is used. The same referral numerals are used in FIGS. 16a–16d to indicate the same signals. According to FIG. 16d, input signals 5420 and 5422 have normalized field amplitude of 1 and a negative baseline 5442 with field amplitude of $-\frac{1}{4}$. The zero level of the field is illustrated by broken line 5440.

Upper part of FIG. 16d illustrates a non-coincidence situation, for example, when there is no input signal at input 5408 and signal 5420 includes only the negative baseline 5442. The negative baseline at input 5406 is also $-\frac{1}{4}$ and thus the peak level of the field amplitude of signal 5422 is $(1-\frac{1}{4})=\frac{3}{4}$. After the summation of gate 5402, the field amplitudes of the baseline and the signal at output 5410 are $(-\frac{1}{4}-\frac{1}{4})=-\frac{1}{2}$ and $(\frac{3}{4}-\frac{1}{4})=\frac{1}{2}$, respectively. Thus the corresponding energy (a square of the field amplitude) at output 5410 is constant with a value of $\frac{1}{4}$, as shown by insertion 5421.

Lower part of FIG. 16d illustrates a coincidence situation when both input signals 5420 and 5422 exist simultaneously at inputs 5408 and 5406, respectively. Signals 5420 and 5422 include negative baseline 5442 of $-\frac{1}{4}$. The peak of the field amplitudes of signal 5420 and 5422 is $(1-\frac{1}{4})=\frac{3}{4}$. After the summation of gate 5402, the field amplitudes of the baseline and the signal at output 5410 are $(-\frac{1}{4}-\frac{1}{4})=-\frac{1}{2}$ and $(\frac{3}{4}+\frac{3}{4})=\frac{3}{2}$, respectively. Thus the corresponding energy (a square of the field amplitude) at output 5410 is a pulse signal 5428 with $\frac{1}{4}$ for the baseline and $\frac{9}{4}$ for the signal, as shown by insertion 5423.

Accordingly, it can be seen that the non-coincidence pulse and the baseline have the same intensity. The use of negative baseline improved the ratio between the coincidence signal and the non-coincidence signal (or the baseline) from 4:1 (in case of coherent summing without negative baseline) to 9:1 (in the case of coherent summing where negative baseline is applied).

An alternative way of enhancing the ratio between the coincidence and the non-coincidence signals, when using a coherent summing, is shown in FIG. 16e. Summing gate 5402 and signals 5420 and 5422 are the same for FIGS. 16d and 16e. A negative baseline is added, by coupler 5451 to the signal at output 5410. The negative baseline is produced by a CW signal at input 5441 of guide 5430 that is coupled into output 5410 with field amplitude of $-\frac{1}{2}$. Accordingly, the coincidence and the non coincidence field amplitudes, with normalized values of 2 and 1, respectively, that have zero baseline at output 5410, are converted, by adding a negative baseline of $-\frac{1}{2}$, into amplitudes of $\frac{3}{2}(2-\frac{1}{2})$ and $\frac{1}{2}(1-\frac{1}{2})$, respectively. This means that the non-coincidence pulse and the baseline have the same power intensity of $\frac{1}{4}$. Insertion 5425 shows the energy at output 5410 after coupler 5451. From insertion 5425, it can be seen that the energies (the square of the field's amplitude) for the coincidence signal, the non-coincidence signal, and the baseline, are $\frac{9}{4}$, $\frac{1}{4}$, and $\frac{1}{4}$, respectively.

Thus the use of added negative baseline at the output of the summing gate improves the ratio between the coincidence signal and the non-coincidence signal from 4:1 to 9:1.

To control the phase of the CW negative baseline at guide 5430 a closed loop 5453 is used. Closed loop 5453 includes controller 5447, phase shifter 5443, coupler 5451, input 5441, trigger input 5449, guides 5430 and 5455, and electrical lead 5457. Controller 5447 receives from guide 5455 the signal from coupler 5451 corresponding to a known signal at the inputs at gate 5402. Trigger input 5449 determines when controller 5447 is activated and deactivated and provides to controller 5447 the information about the signals at inputs 5406 and 5408 of gate 5402.

Controller 5447 converts the optical signals that it receives into electronic signals that can be processed by its processor. Based on the information provided by input 5449, the processor of controller 5447 derives what should be the signal that it receives from guide 5455. The derived signal is compared, by controller 5447, to the averaged measured signal received from guide 5455. Averaging the measured signal received, by controller 5447 and from guide 5455, may be done using an electronic integrator. According to the comparison between the averaged measured signal and the derived signal, controller 5447 produces a control signal transmitted, through lead 5457, to phase shifter 5443. The control signal adjust phase shifter 5443 to produce a phase shift that would cause the average measured signal and the derived signal, at controller 5447 to be equal or similar.

FIG. 17 is illustrates an example of a logic AND gate 5400A, utilizing a summing gate and a threshold device, each chosen out of the variety of implementations described above. Boxes 5448 and 5450, in FIG. 17, includes summing gate and threshold device that are equivalent to boxes 5404 and 5402 in FIG. 16a, respectively. The summing gate of box 5450 is a directional coupler of the type illustrated by FIG. 8e and the threshold device of box 5448 is of the type illustrated by FIG. 12A. Inputs 5406 and 5408, connector 5414, and output 5418 of gate 5400 of FIG. 16a are equivalent to inputs 5454 and 5456, connector 5452, and output 5304 of logic AND gate 5400A of FIG. 17, respectively.

Logic AND gate 5400A of FIG. 17 is similar to logic AND gate 5400 of FIG. 16a, with additional closed loop phase-control 5466 that might be needed when using coherent summing. While the coincidence signal from output 5460 of coupler 5458 is fed, through connector 5452, into input 5306 of the threshold device, the signal from the non-coincidence output 5462 of coupler 5458 is fed through radiation guide 5464 into controller 5474. Controller 5474 converts the signal that it receives from guide 5464 into an electronic monitoring signal. According to the monitored signal, controller 5474 produces an electronic control-signal and sends it, through lead 5468, to control phase shifter 5470. Controller 5474 receives triggering signal in its input 5472. The triggering signal from input 5472 determines when closed loop 5466 is active or inactive and informs controller 5474 what are the states of the input signals at inputs 5454 and 5456. For example, in a situation when the triggering signal from port 5472 corresponding to the situation when both inputs 5454 and 5456 receive input signals simultaneously, then controller 5474 adjusts the control signal to cause phase shifter 5470 to produce a minimum amplitude signal at non-coincidence output 5462 or at guide 5464 (minimum monitored signal). The use of non-coincidence output 5462 as a monitored port has the advantage of producing a phase control without introducing loss in the coincidence output 5460 which is the one of interest. Still it is also possible to use coincidence output 5460 as the monitored output by taping part of its radiation into controller 5474. In this case and for the same situation discussed above, controller 5474 adjusts the control signal to cause phase shifter 5470 to produce a maximum amplitude signal at coincidence output 5460 or at input 5306 (maximum monitored signal). In case that the input signals are in a form of pulses, controller 5474 includes an integrator which averages the monitored signals and according to this average, produces the control signal.

Additional AND Logic Gates

Figure 18A:
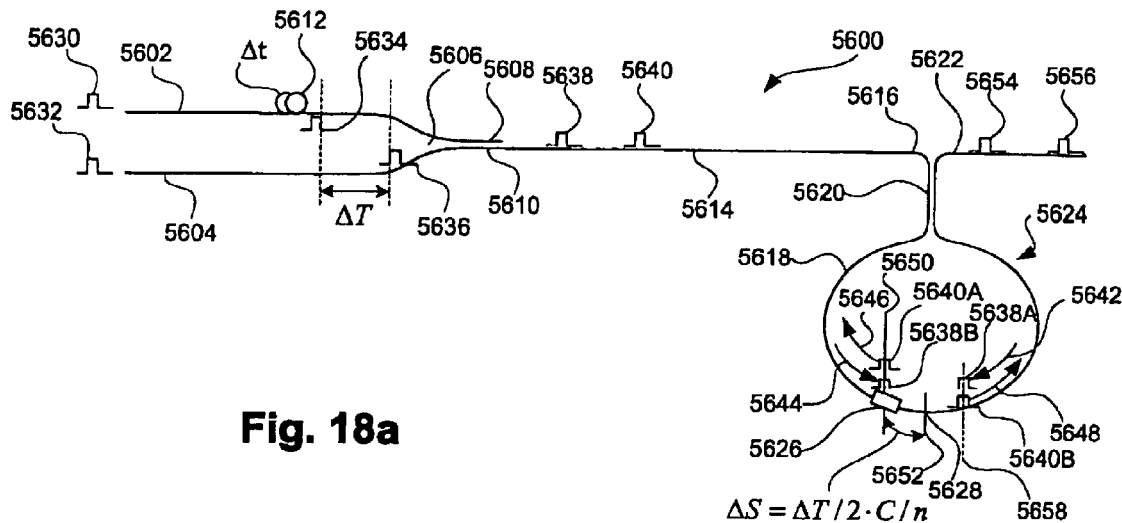
FIGS. 18a–18c are illustrations of phase insensitive AND logic gates according to the present invention.
Figure 18B:
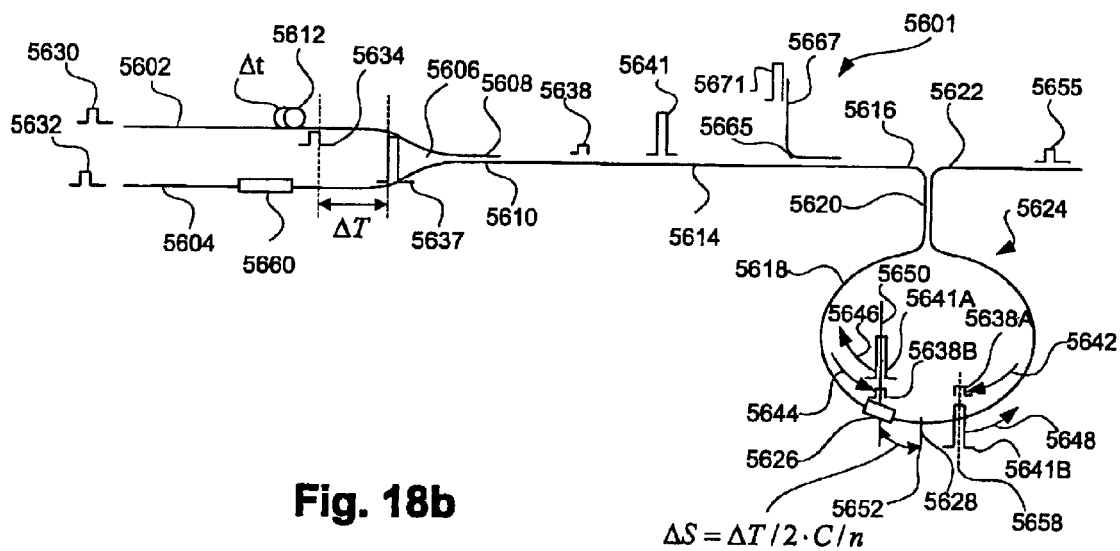
Figure 18C:
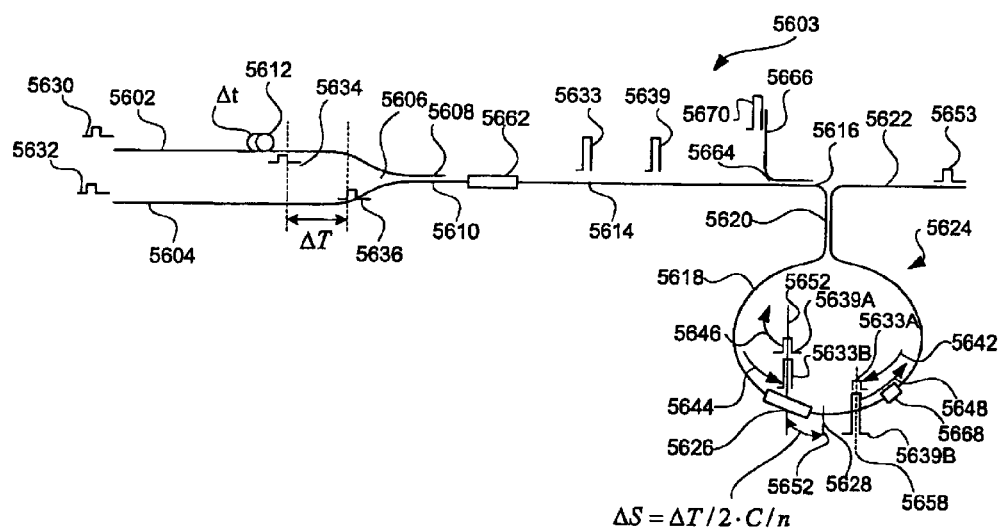

FIGS. 18a–18c illustrate additional configurations for AND logic gates.

FIG. 18a illustrates logic AND gate 5600 that includes directional coupler 5606 having two inputs 5602 and 5604 and two outputs 5608 and 5610. Input 5602 includes delay guide 5612 that produces a time delay Δt. Output 5610 of coupler 5606 is connected, by guide 5614, to input 5616 of a loop mirror (Sagnac loop) 5624. Loop mirror 5624 includes symmetric directional coupler 5620 having, on one of its sides, input 5616 and output 5622 and its other two terminals, on its other side, are connected to each other to form loop 5618. Loop 5618 contains NLE 5626, such as, SOA or LOA that is displaced from mid point 5628 of loop 5618. Mid point 5628 is the point on loop mirror 5624 in which the distances to coupler 5620 in the clockwise and in the counterclockwise directions are the same.

In a situation when gate 5600 receives in either of its inputs 5602 or 5604 either of signals 5630 or 5632 propagating as signal 5634 or 5636, then coupler 5606 launches, into guide 5614, either pulse 5638 or 5640, respectively. In this case, either of the signals 5638 or 5640 enters to loop mirror 5624 through its input 5616. In such a situation when only a single pulse enters to loop 5618 it is split into a pair of pulses. Symmetric coupler 5620 divides pulse 5638 or 5640 into equal amplitude split pulses 5638A and 5638B or 5640A and 5640B propagating in loop 5618 in opposite directions, clockwise and counter counterclockwise as shown by arrows 5642, 5644, 5646, and 5648, respectively. The pulses propagating clockwise and counterclockwise collide in mid point 5628. The displacement of NLE 5626 from mid point 5628 assures that there will not be any collision, on amplifier 5626, between the split pulses 5638A and 5638B or between split pulses 5640A and 5640B. Each pair of split pulses 5638A and 5638B or split pulses 5640A and 5640B experience, during their travel along loop 5618, the same phase shift and the same amplification. The pulses in either of the pairs complete their travel along loop 5618 and return back to coupler 5620 with the same amplitude and with the same relative phase as they had when they enter to loop 5618 from coupler 5620. Each propogating pair 5638A and 5638B or 5640A and 5640B travel the same distance of loop 5618, thus the returned pulses pair reach coupler 5620 at the same time. Accordingly, coupler 5620 combines the returned pulses 5638A and 5638B or 5640A and 5640B in a way that all their energy is emitted back into input 5616 and no signal is emitted through output 5622 of gate 5600. This means that when only one signal 5630 or 5632 is received by gate 5600 at its input 5602 or 5604, no output signal is produced, by gate 5600, at output 5622.

When both signals 5630 and 5632 exist simultaneously at inputs 5602 and 5604, they enter coupler 5606 as pulses 5634 and 5636, respectively, with a time separation of Δt produced by delayer 5612. Coupler 5612 launches pulses 5634 and 5636, into guide 5614, as pulses 5638 and 5640, respectively, having the same time separation Δt. Pulses 5638 and 5640 enter loop 5624 through input 5616 and are split by coupler 5620 into two pairs of pulses 5638A and 5638B and 5640A and 5640B propagating in loop 5618 as described above.

Unlike the above described cases in which either of the split pairs propagates individually in loop 5618 and there is no collision, on amplifier 5626, between the pulses of the different pairs, in this case, some of the pulses in the pairs of pulses 5638A and 5638B and 5640A and 5640B can collide on amplifier 5626.

It can be seen that the pulses propagating in loop 5618 can be divided into two pairs, the pair that propagates clockwise that includes pulses 5640A and 5638A and the pair that propagates counterclockwise that includes pulses 5640B and 5638B. Accordingly, pulses 5640A and 5640B and pulses 5638A and 5638B collide at mid point 5628 defined as the intersection point where line 5652 crosses loop 5618. Pulses 5640B and 5638A collide at the intersection point where line 5658 crosses loop 5618; this point is located at a distance ΔS to the right of mid point 5628. Likewise, Pulses 5638B and 5640A collide at the intersection point where line 5650 crosses loop 5618; this point is located at a distance ΔS to the left of mid point 5628. ΔS is equal to half of the space between pulses 5640 and 5638, 5640B and 5638B or between 5640A and 5638A. The NLE 5626 is displaced, to the left, off center from mid point 5628 by a distance ΔS that is equal to half of the space between the pulses of the pair of pulses that include the following pulses: 5638 and 5640, 5638A and 5640A, or 5638B and 5640B. The amount of displacement of amplifier 5626 from mid point 5628 is indicated by the distance between lines 5650 and 5652 along loop 5618 and is given by:

$$\Delta S = \Delta t/2 \cdot C/n$$

where C is the speed of light in vacuum and n is the index of refraction of the material from which the radiation guides of gate 5600 are made.

In such a case pulses 5638B and 5640A collide on amplifier 5626 on line 5650. The amplitudes of pulses 5638B and 5640A are relatively small amplitudes that are in the linear range of amplifier 5626. However, when amplitudes 5638B and 5640A collide on amplifier 5626, they produce, within NLE 5626, a combined high amplitude signal. The combined high amplitude signal may cause NLE 5626 to produce a phase shift of π radians to each of the pulses 5638B and 5640A during their travel back to coupler 5620.

Accordingly, in the optimal case, pair of pulses 5640A and 5640B may return back to coupler 5620 with a relative phase that differs by π radians from the relative phase between these pulses when they entered loop 5618 from coupler 5620. Thus coupler 5620 combines their radiation constructively in output terminal 5622 and emits their energy thoroughly from output 5622 of gate 5600 as pulse 5656 and no signal is returned back to input 5616, which in this case, is the destructive terminal. A similar process is applied to pulses 5638A and 5638B and their combined radiation is also emitted thoroughly from output 5622 of gate 5600 as pulse 5654.

It can be seen that when an input signal exists at either of the inputs of gate 5600 or no signal exists at its inputs, no output signal is produced at output 5622 of gate 5600. In case that input signals exist simultaneously in both inputs of gate 5600, an output signal in the form of two pulses is formed at the output of gate 5600. Thus when defining the double pulse signal, at output 5622 of gate 5600, with the specific spacing between its pulses, as logic state "1", gate 5600 operates as a logic AND gate.

In case that the logic state "1" should be defined by a single output pulse, a variation of gate 5600 may be used as shown in FIG. 18b.

FIG. 18b illustrates logic AND gate 5601 which is a variation of gate 5600 shown in FIG. 18a. The same referral numeral is used in FIGS. 18a and 18b to indicate similar components and signals. Gate 5601 of FIG. 18b has a structure similar to the structure of gate 5600 of FIG. 18a with the additional optical amplifier 5660 included in input 5604. The time delay Δt and the distance ΔS are the same in both of the drawings.

When an input signal 5630 or 5632 is received by either one of inputs 5602 or 5604, then coupler 5606 receives, in its input, signal 5634 or 5637 and emits signal 5638 or 5641 from its output 5610 into radiation guide 5614, respectively.

The amplitude of signal 5632 is amplified, by amplifier 5660 located at input 5604, to produce high amplitude signal 5637. Accordingly, the amplitude of signal 5637 is larger than the amplitude of signal 5632. Thus the amplitude of signal 5641 corresponding to signal 5637 is larger than the amplitude of signal 5638 corresponding to signal 5634.

When either one of the signals 5641 or 5638 passes through coupler 5665 and enters from guide 5614 to input 5616 of loop mirror 5624 that includes coupler 5620, loop 5618, and NLE 5626, it is reflected back into input 5616 as explained above for individual pulses 5638 and 5641 of FIG. 18*a*. Part of the reflected pulse may be emitted out, from terminal 5667 of coupler 5665, as pulse 5671.

When signals 5632 and 5630 appears simultaneously at inputs 5604 and 5602, a pair of pulses 5641 and 5638 separated by a time delay Δt are produced, respectively, by coupler 5606 and delayer 5612, in a way similar to the explained for pulses 5640 and 5638 of FIG. 18*a*. Unlike signal 5640 of FIG. 18*a*, Signal 5641 of FIG. 18*b* has a larger amplitude than the amplitude of signal 5638.

When the two pulse signals 5641 and 5638 are received at input 5616 of coupler 5620, they are split into two pairs of pulses that propagate in loop 5618 in opposite directions. The pair that includes signals 5641A and 5638A travels clockwise and the pair that includes signals 5641B and 5638B travels counterclockwise. Pulses 5641B and 5638A pass, on their way back to coupler 5620, through amplifier 5626 without colliding, at this amplifier, with other signals. Pulses 5641A and 5638B pass, on their way back to coupler 5620, through amplifier 5626 while colliding, at this amplifier, with each other.

The high amplitude of signals 5641A and 5641B is in the saturated range of amplifier 5626 and the amplitude of signals 5638A and 5638B is relatively small and is in the linear range of amplifier 5626. In the optimal case, the phase difference between the phase shifts, produced by amplifier 5626, for the high amplitude of signals 5641A and 5641B and the low amplitude of signals 5638A and 5638B is π radians. The phase of large signal 5641B that individually passes through amplifier 5626 is shifted by the same amount as the phase of large signal 5641A when passing through amplifier 5626 and colliding, at this amplifier, with pulse 5638B since amplifier 5626 is saturated in both cases. Accordingly, large amplitude pulses 5641A and 5641B return back to coupler 5620 and are combined there with the same relative phase in which they entered loop 5618 from coupler 5620. Thus the energy of combined pulses 5641A and 5641B is totally reflected back into input 5616 and part of that energy is coupled, by coupler 5665, into terminal 5667 and is emitted there as pulse 5671. In this case no output signal is generated at output 5622.

The phase of signal 5638B passing through amplifier 5626 and colliding, on this amplifier, with pulse 5641A is shifted by π radians relative to the phase of signal 5638A passing through amplifier 5626 without colliding with any other pulse. This relative phase shift of π radians is produced since amplifier 5626 is driven into saturated region by pulse 5641A, phase shifting pulse 5638B that passes amplifier 5626 at the same time. When pulse 5638A passes through amplifier 5626 alone (without colliding with any other pulse), the amplifier 5626 is not saturated, thus operates in the linear region, and no relative phase shift occurs.

Thus, in this optimal situation, pulses 5638A and 5638B return back to coupler 5620 and are combined there with a relative phase which differs by π radians from the phase in which they entered loop 5618 from coupler 5620. Accordingly, the energy of combined pulses 5638A and 5638B is thoroughly emitted from output 5622 as signal 5655 and no signal is reflected back into input 5616 or terminal 5667.

The distance in which amplifier 5626 is displaced off center from mid point 5628 has to assure interaction between signals 5638B and 5641A. In a situation that the recovery time of amplifier 5626 (after being driven into saturation by signal 5638B) is τ, then its interaction length L is given by:

$$L = C \cdot \tau / n.$$

Accordingly, gate 5601 can operate in a manner similar to the explained above even if signal 5641A would not collide with signal 5638B, on amplifier 5626, and would reach amplifier 5626 at a time τ after signal 5638B. This means that for proper operation, device 5601 can tolerate a deviation in the value of ΔS in the amount that up to L/2 to the left of line 5652. At the same time distance ΔS has to assure that no interaction would occur between signals 5638A and 5638B or between signals 5641A and 5641B and thus should satisfy:

$$\Delta S > L$$

It can be seen that when an input signal exists at either of the inputs of gate 5601 or no signal exists at its inputs, no output signal is produced at output 5622 of gate 5601. In case that two input signals exist simultaneously in both inputs 5602 and 5604 of gate 5601, an output signal is formed at the output of gate 5601. Thus gate 5601 of FIG. 18*b* operates as a logic AND gate that unlike gate 5600 of FIG. 18*a*, produces a single output signal 5655 for its logic sate "1" at its output 5622.

FIG. 18*c* illustrates an additional design for gates 5600 and 5601 illustrated by FIGS. 18*a* and 18*b*, respectively. The design of gate 5603 of FIG. 18*c* is similar to the design of gate 5601 of FIG. 18*b*. Accordingly, the same referral numerals are used in FIGS. 18*b* and 18*c* to indicate similar components and signal. The following changes were done to convert the design of FIG. 18*b* into the design of FIG. 18*c*:

1. Amplifier 5660 was moved from input 5604 to guide 5614 and is marked as amplifier 5662.
2. Attenuator 5668 was added to loop 5618.
3. Coupler 5664 was added on guide 5614 at input 5616 of mirror loop 5624.

The same conditions for the distance ΔS, in which amplifier 5626 should be displaced off center from mid point 5628 of FIG. 18*b*, also stand for the design of FIG. 18*c*.

Pulses 5639 and 5633 in radiation guide 5614 are formed, as explained for gate 5600 of FIG. 18*a*, by the interleaver that includes inputs 5602 and 5604, delayer 5612, and coupler 5606 with the additional amplification by amplifier 5662. Accordingly, when input signal 5630 or 5632 is received by input 5602 or 5604, respectively, then signal 5633 or 5639 is produced at guide 5614.

In any of these cases, one signal (5633 or 5639) enters, with high amplitude, to device 5624 through its input 5616. Device 5624 including input 5616, output 5622, coupler 5620, loop 5618, amplifier 5622 and attenuator 5668, is similar to threshold device 5300 of FIG. 12*a* and behaves similarly. Thus, in optimal conditions and when high amplitude signal 5633 or 5639 enters device 5624, its amplitude is above the threshold of device 5624 and, as explained above for device 5300 of FIG. 12*a*, it is emitted out of device 5624 through its output 5622 and no signal returns back into input 5616.

When input signals 5630 and 5632 are received simultaneously, by inputs 5602 and 5604, respectively, then signals 5633 and 5639 are produced at guide 5614. In this case, signal 5633 is delayed relative to signal 5639 by a time delay Δt produced by delayer 5612. In this case, when pair of high amplitude signals 5639 and 5633 is received in input 5616 it is split, by coupler 5620 into two pairs of pulses that propagate in loop 5618 in opposite directions. One pair includes signals 5639A and 5633A travels clockwise along arrows 5646 and 5642. This pair is converted, by attenuator 5668, into a pair of small amplitude signals 5639A and 5633A that are in the linear range of amplifier 5626. The other pair includes high amplitude signals 5639B and 5633B that are in the saturated region of amplifier 5626 and travels counterclockwise along arrows 5648 and 5644. Signals 5639B and 5633A pass, on their way back to coupler 5620, through amplifier 5626 without colliding or interacting with other signals on or by this amplifier. Pulses 5639A and 5633B pass, on their way back to coupler 5620, through amplifier 5626 while colliding or interacting with each other on or by this amplifier.

The large amplitude of signals 5633B and 5639B fall within the saturated region of amplifier 5626; the amplitude of signals 5633A and 5639A is relatively small and is in the linear region of amplifier 5626. In the optimal case, the phase difference between the phase shifts, produced by amplifier 5626, for the high amplitude of signals 5633B and 5639B and the low amplitude of signals 5633A and 5639A is π radians. The phase of high amplitude signal 5639B passing through amplifier 5626 is shifted according to the saturated state of amplifier 5626. In spite of the fact that signal 5639A is a low amplitude signal, the phase shift caused to this signal, by amplifier 5626, is according to the saturated state of amplifier 5626. This phase shift is produced by amplifier 5626 since at the same time that pulse 5639A passes through amplifier 5626, this amplifier is driven into saturated state, by pulse 5633B. Thus, the phase of signal 5639B passing through amplifier 5626 is shifted by the same amount as the phase of signal 5633B when it passes through amplifier 5626 and collide or interact, on or by this amplifier, with pulse 5639A since amplifier 5626 is saturated in both of the cases. Accordingly, pulses 5639A and 5639B return back to coupler 5620 and are combined there with the same relative phase in which they entered to loop 5618 from coupler 5620. Thus the energy of combined pulses 5639A and 5639B is totally reflected back into input 5616 and no output signal is generated at output 5622. The signal reflected back into input 5616 is emitted out, as signal 5670, by coupler 5664 through output 5666.

The high amplitude signal 5633B that passes through amplifier 5626 drives this amplifier into saturated state even without the collision, on this amplifier, with pulse 5639A. This means that the collision of pulse 5633B with pulse 5639A does not influence the phase shift of pulse 5633B produced by amplifier 5626. Pulse 5633A passes through amplifier 5626 without any interaction with other pulses. Thus, pulses 5633A and 5633B return back to coupler 5620 and are combined there with a relative phase that is not influenced by the collision on amplifier 5626. In such a case, device 5624 operates, for pulses 5633A and 5633B, in the regular mode of threshold device and as explained for threshold device 5300 of FIG. 53. Accordingly, the energy of combined pulses 5633A and 5633B is thoroughly emitted from output 5622 as signal 5653 and no signal is reflected back into input 5616 and thus no signal is generated at output 5666.

It can be seen that when an input signal exists at either of the inputs of gate 5603 or no signal exists at its inputs, no output signal is produced at output 5666 of gate 5603. In case that input signals exist simultaneously in both of the inputs of gate 5603, an output signal is formed at the output of gate 5666. Thus gate 5603 of FIG. 18c operates as a logic AND gate that like gate 5601 of FIG. 18b but, unlike gate 5600 of FIG. 18a, produces a single output signal for its logic sate "1" at its output.

It should be clear that under optimal conditions the logic states "1" and "0" are represented by the existence and the absence of signals in the outputs of gates 5600, 5601 and 5603 of FIGS. 18a–18c, respectively. If the conditions are not optimal, the logic states "1" and "0" are represented by high and low signals in these outputs.

NAND Gate

Referring to FIGS. 19a and 19b illustrate NAND gates 5500 according to the present invention. The NAND gates 5500 of FIGS. 19a and 19b and the AND gates described above are the basic building blocks of logic gates. A logical NAND gate is known to be a complete function, and can be used solely as a building block to implement other important binary logical functions such as, but not limited to, logical NOT, logical AND and logical OR gates.

NAND gate 5500 of FIG. 19a includes AND gate 5400 having inputs 5502 and 5504 and output 5506 that produces the logic function AND of these inputs. The signal from output 5506 passes through phase shifter 5508 and enters input 5510 of directional coupler 5518. The other input 5516 of coupler 5518 receives a constant signal at a logic level of "1". The phase of the signal at input 5510 is adjusted to produce, together with the signal from input 5516, destructive interference at output 5528 of NAND gate 5500. In a situation when no signal exists at inputs 5502 and 5504 or only one signal exist at either of these inputs, there is no output signal at output 5506 and output 5528 of gate 5500 receives signal from input 5516 and it is at a logic state "1". When both of inputs 5502 and 5504 simultaneously receive input signal, then an output signal is produced at output 5506. The signal from output 5506 appears at input 5510 and destructively interferes with the signal from input 5516 to produce a zero signal at output 5528. Accordingly, it can be seen that the subtraction, at coupler 5518, between logic state "1" from port 5516 and the AND signal at port 5510 received from gate 5400, acts as a logic function NOT on the AND signal from gate 5400 and produces logic function NAND at port 5528 of NAND gate 5500.

To maintain the phase of the signal received from gate 5400 such that it will destructively interfere, at port 5528, with the signal from port 5516, closed loop 5530 is used. Closed loop 5530 is similar to closed loop 5453 of FIG. 16e. The components: controller 5526, phase shifter 5508, coupler 5518, input 5516, trigger input 5522, guides 5510 and 5520, and lead 5524 of loop 5530 in FIG. 19a, are analog to the components: controller 5447, phase shifter 5443, coupler 5451, input 5441, trigger input 5449, guides 5430 and 5455, and lead 5457 of loop 5453 of FIG. 16e. Accordingly, closed loops phase control 5530 and 5453 of FIGS. 19a and 16e, respectively, operate in a similar manner and thus the description and the explanations written above for loop 5453 also stand for loop 5530 and will not be repeated here.

FIG. 19b illustrates another version of logic NAND gate 5500 that is phase insensitive and does not require a phase loop control, such as, loop 5530 of FIG. 19a. AND gate 5400 of FIG. 19a is the same as gate 5400 of FIG. 19b. The output signal of AND gate 5400 at output 5506 should be of high intensity or may be amplified, by optical amplifier 5509, on its way to input 5510 of optical amplifier 5512. Amplifier 5512 receives at its input 5514 a constant logic state signal of "1". In the absence of signal from gate 5400, at input 5510, the signal from input 5514 is amplified by amplifier 5512 and part of this signal is emitted from output 5516 of coupler 5518. This means that when no signal exists at inputs 5502 and 5504 or only one signal exists at either of these inputs, there is no signal neither at output 5506 nor at input 5510 and output 5516 of gate 5500 is at a logic state "1". When both of inputs 5502 and 5504 simultaneously receive input signals, then an output signal is produced at output 5506. Signal 5506 appears, after amplification of amplifier 5509, with high amplitude at input 5510 of amplifier 5512 and drives that amplifier into deep saturation. As can be seen, terminals 5510 and 5514 of amplifier 5512 serve as both input and output terminals, thus shall be referenced below as i/o terminal 5510 and i/o terminal 5514. When amplifier 5512 is saturated, its saturation output power $P_{sat}$ is fixed and does not increase with the inputs power $P_1$ and $P_2$ received at i/o terminals 5510 and 5514. The input power $P_1$ received at i/o terminal 5510 is transmitted, by saturated amplifier 5512, into i/o terminal 5514 as output power $P_{o1}$. Similarly, the input power $P_2$ received at i/o terminal 5514 is transmitted, by saturated amplifier 5512, into i/o terminal 5510 as output power $P_{o2}$. The saturated output power $P_{sat}$ is distributed, into outputs power $P_{o1}$ and $P_{o2}$ at i/o terminals 5514 and 5510, proportionally to inputs power $P_1$ and $P_2$, respectively. Accordingly, $P_{o2}$ is given by $$P_{sat} \cdot \frac{P_2}{P_1 + P_2}$$

and since $P_2 \ll P_1$, only a small fraction of the saturated out power $P_{sat}$ is emitted, into i/o terminal 5510, as $P_{o2}$. The intensity of the logical state at output 5516 of NAND gate 5500 is proportional to output power $P_{o2}$. When $P_1$ is zero (logic state "1" at output 5516), $P_{o2}$ may have a value up to $P_{sat}$ and when $P_1$, for example, is equal to $P_{sat}$ (logic state "0" at output 5516), $P_{o2}$ is smaller than $P_{sat}$ by a factor $$\frac{P_2}{P_1 + P_2} \ll 1.$$

Since the intensity of the logical states of NAND gate 5500 at output 5516 is proportional to $P_{o2}$, the ratio between the intensities of logic states "1" and "0" is very big $$\left(\frac{P_2 + P_1}{P_2} \gg 1\right).$$

Accordingly, when amplifier 5512 is deeply saturated, the amplitude of the signal that it transmits, from its input 5514, is strongly reduced to produce a zero or low level signal at output 5516, corresponding to logical state "0". Amplifier 5512 can be set to excite at a relatively low excitation level to enable its saturation even by relatively small amplitude signals produced by gate 5400 and amplifier 5509.

Accordingly, it can be seen that the interaction, at amplifier 5512, between logic state "1" from port 5514 and the AND signals at port 5510 received from gate 5400, acts as a logic function NOT on the AND signal from gate 5400 and produces logic function NAND at port 5516 of NAND gate 5500.

FIG. 19c illustrates an optical circulator 5600 that may be used to replace coupler 5518 of FIG. 19b serving as a signal directing device. Terminals 5602, 5604, and 5606 of circulator 5600 of FIG. 19c are illustrated as being passing through points 5518A, 5518B and 5518C corresponding to points 5518A, 5518B and 5518C of FIG. 19b, respectively. The use of circulator 5600 of FIG. 19c to replace coupler 5518 in FIG. 19b has the advantage that circulator 5600 may transmit the whole energy from point 5518A to point 5518B and may transmit the whole energy from point 5518B to point 5518C while directional coupler 5518 transmits only part of the energy between the above described points 5518A to 5518B, and 5518B to 5518C.

Similarly, a circulator such as circulator 5600 of FIG. 19c may replace couplers 5665 and 5664 in FIGS. 18b and 18c, respectively.

All the embodiments according to the present, may include a continuous sequence of optical components connected by light guiding media such as, for example, optical fibers, planar waveguides, or planar circuits (PLC), which media may be fabricated using integrated optic techniques and/or on-chip manufacturing. Alternatively, All the embodiments according to the present may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators may include variable and/or adjustable components.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An optical AND logic gate comprising:
   i) a combining device having first and second inputs and a first output, one of said first and second inputs including an optical delay line;
   ii) a splitting device having first second third and fourth terminals; and
   iii) a nonlinear element;
   iv) said third and fourth terminals form an optical loop including said nonlinear element displaced from the center of said optical loop;
   v) said first and second inputs arranged to receive first and second optical signals for producing a third optical signal at said first output of said combining device;
   vi) the first terminal of said splitting device arranged to receive said third optical signal from said first output of said combining device for producing at said second terminal a signal corresponding to the AND product of said first and second optical signals.

2. The optical logic gate of claim 1 wherein said nonlinear element is a semiconductor amplifier (SOA).

3. The optical logic gate of claim 1 wherein said optical logic gate is fabricated on a chip.

4. An optical AND logic gate comprising:
   i) a combining device having first and second inputs and a first output, one of said first and second inputs including an optical delay line and said first output including a directing device for directing optical signal returning to said first output into a second output;
   ii) a splitting device having first second and third terminals; and
   iii) a nonlinear element;
   iv) said second and third terminals from an optical loop including said nonlinear element displaced from the center of said optical loop;

v) said first and second inputs arranged to receive first and second optical signals for producing a third optical signal at said first output of said combining device;

vi) the first terminal of said splitting device arranged to receive said third optical signal from said first output of said combining device for producing at said second output a signal corresponding to the AND product of said first and second optical signals.

5. The optical logic gate of claim 4 wherein said nonlinear element is a semiconductor optical amplifier (SOA).

6. The optical logic gate of claim 4 wherein said optical logic gate is fabricated on a chip.

7. The optical logic gate of claim 4 wherein said directing device is selected from a group of directing devices including optical couplers and optical circulators.

8. The optical logic gate of claim 4 wherein said one of said first and second inputs further includes an optical amplifier.

9. An optical AND logic gate comprising:

i) a combining device having first and second inputs and a first output, one of said first and second inputs including an optical delay line and said first output including a directing device for directing optical signal returning to said first output into a second output;

ii) a splitting device having first second and third terminals;

iii) a nonlinear element; and iv) an attenuator;

v) said second and third terminals form an optical loop including said attenuator and said nonlinear element displaced from the center of said optical loop;

vi) said first and second inputs arranged to receive first and second optical signals for producing a third optical signal at said first output of said combining device;

vii) the first terminal of said splitting device arranged to receive said third optical signal from said first output of said combining device for producing at said second output a signal corresponding to the AND product of said first and second optical signals.

10. The optical logic gate of claim 9 wherein said nonlinear element is a semiconductor optical amplifier (SOA).

11. The optical logic gate of claim 9 wherein said optical logic gate is fabricated on a chip.

12. The optical logic gate of claim 9 wherein said directing device is selected from a group of directing devices including optical couplers and optical circulators.

13. The optical logic gate of claim 9 wherein said attenuator is a semiconductor optical amplifier (SOA).

* * * * *